US011816515B2

(12) United States Patent
Takechi et al.

(10) Patent No.: US 11,816,515 B2
(45) Date of Patent: Nov. 14, 2023

(54) PRINT DATA EDITING DEVICE EDITING PRINT DATA SUCH THAT NUMBER OF ON-DOTS IN IMAGE REPRESENTED BY PRINT DATA IS REDUCED

(71) Applicant: BROTHER KOGYO KABUSHIKI KAISHA, Nagoya (JP)

(72) Inventors: Mina Takechi, Nagoya (JP); Yuki Naruse, Toyoake (JP); Kohei Terada, Kiyosu (JP); Isao Fukuchi, Gifu (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/052,748

(22) Filed: Nov. 4, 2022

(65) Prior Publication Data
US 2023/0144007 A1    May 11, 2023

(30) Foreign Application Priority Data

Nov. 8, 2021    (JP) .................................. 2021-182212

(51) Int. Cl.
*G06K 15/02*        (2006.01)
(52) U.S. Cl.
CPC ....... *G06K 15/1835* (2013.01); *G06K 15/028* (2013.01)
(58) Field of Classification Search
CPC .................................................. G06K 15/1835
USPC ........................................................ 358/3.26
See application file for complete search history.

(56) References Cited

U.S. PATENT DOCUMENTS

| 2017/0197408 | A1* | 7/2017 | Saito | ..................... | B41J 2/04536 |
| 2023/0142756 | A1* | 5/2023 | Naruse | ................... | H04N 1/053 |
|  |  |  |  |  | 358/1.2 |
| 2023/0146630 | A1* | 5/2023 | Naruse | ............... | G06K 15/1898 |
|  |  |  |  |  | 358/1.9 |
| 2023/0148298 | A1* | 5/2023 | Takechi | ............... | G06K 15/102 |
|  |  |  |  |  | 358/1.15 |

FOREIGN PATENT DOCUMENTS

JP    2016-168794 A    9/2016

\* cited by examiner

*Primary Examiner* — Jacky X Zheng
(74) *Attorney, Agent, or Firm* — KENEALY VAIDYA LLP

(57) ABSTRACT

A print data editing device includes a controller configured to performs acquiring print data, and converting the print data. The converting includes determining, as a conversion sub-dot, one or more of sub-dots included in a sub-line for each of all sub-lines constituting one line within printing areas in an image represented by the print data, and editing the print data such that the print data indicates OFF for the one or more sub-dots determined as the conversion sub-dot. Each sub-line is constituted by the sub-dots. The sub-dot is a printing unit obtained by dividing a dot into M parts in a sub-scanning direction, where M is an integer of two or greater. The sub-dot for which the print data indicates ON is a printing area. The sub-dot for which the print data indicates OFF is a non-printing area. An area outside a printing region is also the non-printing area.

12 Claims, 20 Drawing Sheets

1 dot 2 dot 3 dot 4 dot 6 dot 8 dot 16 dot 1 dot 2 dot 3 dot 4 dot 6 dot 8 dot 16 dot

PRINT DATA EDITING DEVICE EDITING PRINT DATA SUCH THAT NUMBER OF ON-DOTS IN IMAGE REPRESENTED BY PRINT DATA IS REDUCED

REFERENCE TO RELATED APPLICATIONS

This application claims priority from Japanese Patent Application No. 2021-182212 filed on Nov. 8, 2021. The entire content of the priority application is incorporated herein by reference.

BACKGROUND ART

A conventional printing device uses a thermal line head provided with a plurality of heating elements to print on a print medium. When a printing device is operated using a power supply such as a battery and AC adapter, the electric current that can be supplied simultaneously to the thermal line head is limited by the specifications of the power supply. Therefore, the conventional printing device corrects print data based on the number of dots being printed by dividing the print data into dots having even-numbered and odd-numbered positions in order to suppress the peak value of the current supplied to the thermal line head.

DESCRIPTION

However, the conventional printing device cannot sufficiently raise the temperature of heating elements at the printing start point of a border and the like. Consequently, the start point of the border or the like may appear faint, making it difficult for the conventional printing device to achieve both high printing quality and fast printing speed.

In view of the foregoing, it is an object of the present disclosure to provide a print data editing device, method, and storage medium for editing print data in order to improve both printing quality and printing speed over the conventional technology.

In order to attain the above and other objects, according to one aspect, the present disclosure provides a print data editing device including a controller. The controller is configured to edit print data to be used in a printing device. The printing device includes a print head, a conveying unit, and an ink ribbon. The print head includes a plurality of heating elements linearly arrayed in a main scanning direction. The conveying unit is configured to cause the print head and a print target to move relative to each other in a sub scanning direction crossing the main scanning direction. The print data includes data indicating either ON or OFF for each heating element. The printing device is configured to perform image formation on the print target on the basis of the print data while causing the print head and the print target to move relative to each other in the sub scanning direction to thereby form an image represented by the print data on the print target. The printing device is configured to form the image by causing, on the basis of the print data, selected one or more of the heating elements to generate heat to transfer ink of the ink ribbon onto the print target line by line. The image represented by the print data is constituted by a plurality of dots defined by the plurality of heating elements. One line is constituted by a plurality of sub-lines. Each sub-line is constituted by a plurality of sub-dots. The sub-dot is a printing unit obtained by dividing the dot into M parts in the sub-scanning direction, where M is an integer of two or greater. The sub-dot for which the print data indicates ON is a printing area. The sub-dot for which the print data indicates OFF is a non-printing area. An area outside a printing region is the non-printing area. The controller is configured to perform: (a) acquiring print data representing an image; and (b) converting the print data acquired in (a). The converting in (b) includes: (b1) determining, as a conversion sub-dot, one or more of the sub-dots included in the sub-line for each of all the sub-lines constituting the one line within the printing areas in the image represented by the print data acquired in (a); and (b2) editing the print data acquired in (a) such that the print data acquired in (a) indicates OFF for the one or more sub-dots determined in (b1) as the conversion sub-dot.

According to another aspect, the present disclosure provides a print data editing method performed by a controller of a print data editing device configured to edit print data to be used in a printing device. The printing device includes a print head, a conveying unit, and an ink ribbon. The print head includes a plurality of heating elements linearly arrayed in a main scanning direction. The conveying unit is configured to cause the print head and a print target to move relative to each other in a sub scanning direction crossing the main scanning direction. The print data includes data indicating either ON or OFF for each heating element. The printing device is configured to perform image formation on the print target on the basis of the print data while causing the print head and the print target to move relative to each other in the sub scanning direction to thereby form an image represented by the print data on the print target. The printing device is configured to form the image by causing, on the basis of the print data, selected one or more of the heating elements to generate heat to transfer ink of the ink ribbon onto the print target line by line. The image represented by the print data is constituted by a plurality of dots defined by the plurality of heating elements. One line is constituted by a plurality of sub-lines. Each sub-line is constituted by a plurality of sub-dots. The sub-dot is a printing unit obtained by dividing the dot into M parts in the sub-scanning direction, where M is an integer of two or greater. The sub-dot for which the print data indicates ON is a printing area. The sub-dot for which the print data indicates OFF is a non-printing area. An area outside a printing region is the non-printing area. The print data editing method includes: (a) acquiring print data representing an image; and (b) converting the print data acquired in (a). The converting in (b) includes: (b1) determining, as a conversion sub-dot, one or more of the sub-dots included in the sub-line for each of all the sub-lines constituting the one line within the printing areas in the image represented by the print data acquired in (a); and (b2) editing the print data acquired in (a) such that the print data acquired in (a) indicates OFF for the one or more sub-dots determined in (1) as the conversion sub-dot.

According to still another aspect, the present disclosure provides a non-transitory computer-readable storage medium storing a set of computer-readable instructions for a print data editing device comprising a processor configured to edit print data to be used in a printing device. The printing device includes a print head, a conveying unit, and an ink ribbon. The print head includes a plurality of heating elements linearly arrayed in a main scanning direction. The conveying unit is configured to cause the print head and a print target to move relative to each other in a sub scanning direction crossing the main scanning direction. The print data includes data indicating either ON or OFF for each heating element. The printing device is configured to perform image formation on the print target on the basis of the print data while causing the print head and the print target to move relative to each other in the sub scanning direction to thereby form an image represented by the print data on the print target. The printing device is configured to form the image by causing, on the basis of the print data, selected one or more of the heating elements to generate heat to transfer ink of the ink ribbon onto the print target line by line. The image represented by the print data is constituted by a plurality of dots defined by the plurality of heating elements. One line is constituted by a plurality of sub-lines. Each sub-line is constituted by a plurality of sub-dots. The sub-dot is a printing unit obtained by dividing the dot into M parts in the sub-scanning direction, where M is an integer of two or greater. The sub-dot for which the print data indicates ON is a printing area. The sub-dot for which the print data indicates OFF is a non-printing area. An area outside a printing region is the non-printing area. The set of computer-readable instructions, when executed by the processor, causes the print data editing device to perform: (a) acquiring print data representing an image; and (b) converting the print data acquired in (a). The converting in (b) includes: (b1) determining, as a conversion sub-dot, one or more of the sub-dots included in the sub-line for each of all the sub-lines constituting the one line within the printing areas in the image represented by the print data acquired in (a); and (b2) editing the print data acquired in (a) such that the print data acquired in (a) indicates OFF for the one or more sub-dots determined in (b1) as the conversion sub-dot.

Figure 1:
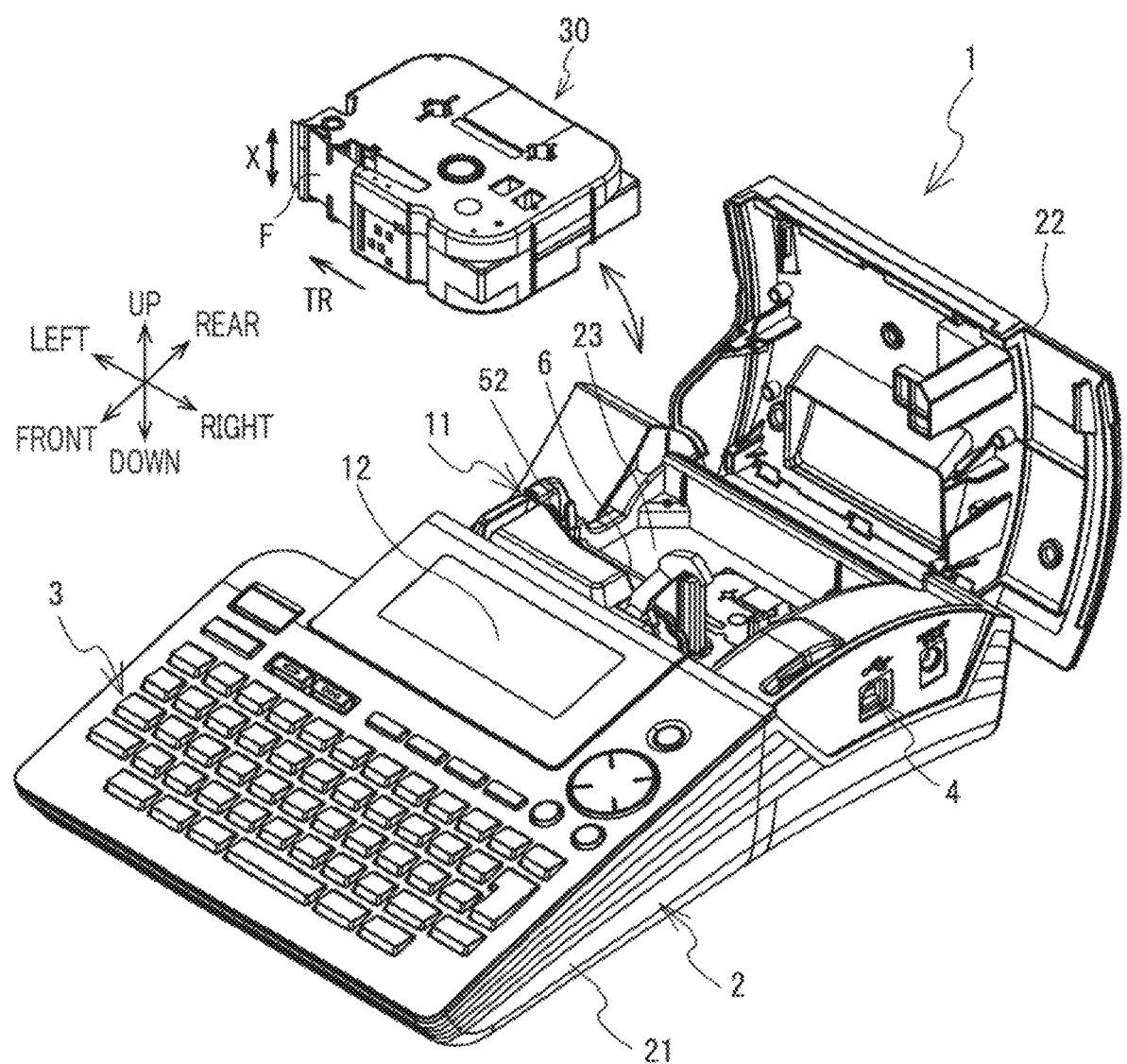
FIG. 1 is a perspective view of a printing device 1.

A printing device 1 according to one embodiment of the present disclosure will be described while referring to the accompanying drawings. The drawings will be used to describe the technical features that can be employed in the present disclosure. In other words, the configurations and control of the device depicted in the drawings are not limited thereto but are merely illustrative examples.

As shown in FIG. 1, the printing device 1 is a thermal transfer printer configured to print characters (objects such as letters, symbols, numbers, and figures) on a print target F. The printing device 1 forms an image on the print target F by thermally transferring material from an ink ribbon 48 (see FIG. 2) onto the print target F. The print target F is not limited to any specific medium, but may be in a sheet or tape form, for example. In the present embodiment, the print target F is a long continuous medium accommodated in a tape cassette 30. The printing device 1 also functions as a print data editing device that edits print data.

Figure 2:
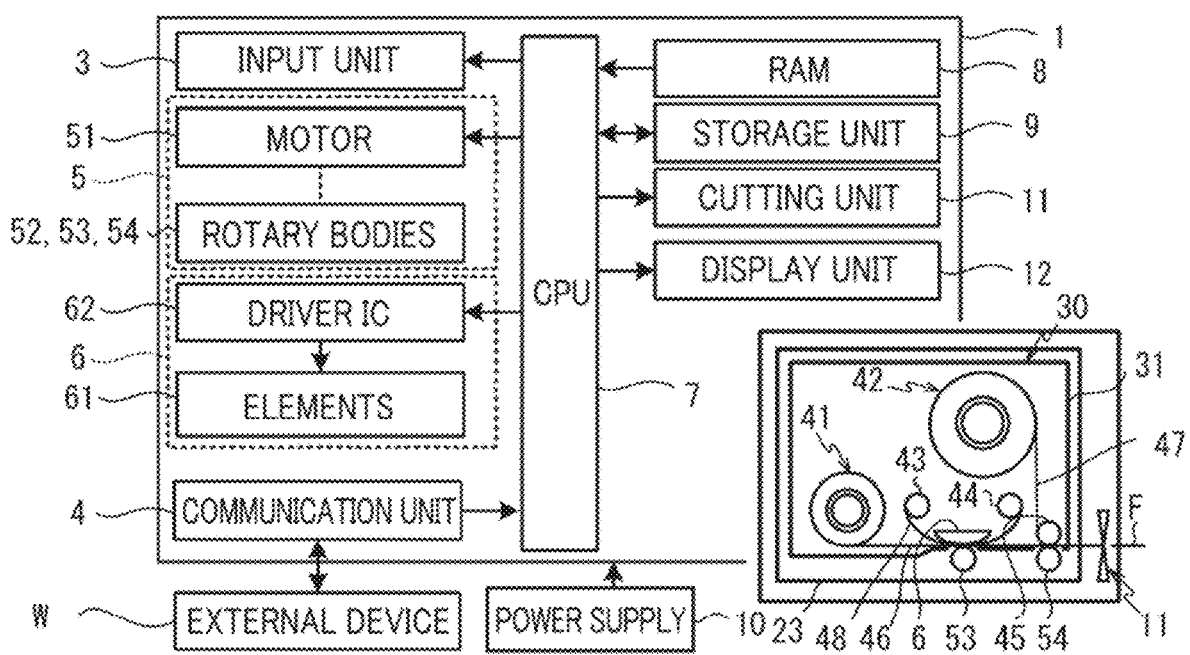
FIG. 2 is a block diagram of the electrical configuration of the printing device 1.

The printing device 1 is provided with a case 2, an input unit 3, a communication unit 4, a cutting unit 11, a display unit 12, a conveying unit 5 shown in FIG. 2, and a print head 6. The case 2 is box-shaped and provided with a main body 21, a cover 22, and an attachment portion 23. The case 2 accommodates the conveying unit 5, print head 6, and cutting unit 11. A power supply 10 shown in FIG. 2 is detachably accommodated in the case 2. The power supply 10 supplies power to the printing device 1. The cover 22 is rotatably supported on the upper-rear portion of the main body 21. The tape cassette 30 described later is attachable to and detachable from the attachment portion 23.

As shown in FIG. 2, the tape cassette 30 is provided with a first tape roll 41, a second tape roll 42, a ribbon roll 43, a ribbon take-up spool 44, and a pressure roller 45. The first tape roll 41 is formed of a film 46 wound into a roll shape. The second tape roll 42 is formed of a double-sided adhesive tape 47 wound into a roll shape. The ribbon roll 43 is formed of the ink ribbon 48 wound into a roll shape. The ink ribbon 48 is passed between the ribbon roll 43 and ribbon take-up spool 44. The ribbon take-up spool 44 takes up ink ribbon 48 that has been used for printing. The pressure roller 45 is exposed to the outside of the tape cassette 30.

The input unit 3 and display unit 12 are provided on the top surface of the main body 21. The input unit 3 includes a plurality of pushbuttons. The communication unit 4 is a universal serial bus (USB) jack provided on the right surface of the case 2. The display unit 12 is a liquid-crystal display (LCD). The communication unit 4 can be connected to a USB cable connector. The cutting unit 11 is provided near an outlet through which the print target F is discharged. The cutting unit 11 cuts the print target F at a predetermined position.

The conveying unit 5 is provided with a motor 51, and rotatable bodies 52, 53, and 54 shown in FIG. 2. The rotatable bodies 52, 53, and 54 are each rotatable about an axis extending in the up-down direction (i.e., vertically). When the tape cassette 30 is mounted in the attachment portion 23, the rotatable body 52 engages with the pressure roller 45. The rotatable bodies 53 and 54 are rollers. The motor 51 rotates the rotatable bodies 52, 53, and 54. The rotatable body 52 rotates the pressure roller 45. By rotating the rotatable bodies 52, 53, and 54 to convey the print target F in a conveying direction TR, the conveying unit 5 moves the print target F relative to the print head 6. In the present embodiment, the conveying direction TR is parallel to the left-right direction. In the following description, the right side in the conveying direction TR will be called the upstream side, while the left side will be called the downstream side.

The print head 6 is provided on the rear side of the rotatable body 53. The print head 6 is a line head that includes a plurality of elements 61, and a driver IC 62 shown in FIG. 2. The elements 61 in the present embodiment are heating elements that generate heat when energized. The elements 61 print on the print target F by generating heat while contacting the print target F, which is pressed rearward by the rotatable body 53. The driver IC 62 energizes one or more selected ones of the elements 61 to cause the same to generate heat.

Next, the electrical configuration of the printing device 1 will be described with reference to FIG. 2. In addition to the communication unit 4, input unit 3, conveying unit 5, print head 6, cutting unit 11, and display unit 12 described above, the printing device 1 is provided with a CPU 7, a RAM 8, and a storage unit 9. The conveying unit 5 is provided with the motor 51, and the rotatable bodies 52, 53, and 54. The print head 6 is provided with the driver IC 62, and the plurality of elements 61. The CPU 7 controls the printing device 1. The CPU 7 is electrically connected to the RAM 8, storage unit 9, communication unit 4, input unit 3, motor 51, driver IC 62, cutting unit 11, and display unit 12. The RAM 8 stores various variables and other temporary data. The storage unit 9 stores programs, such as a print data editing program described later, that the CPU 7 executes for controlling the printing device 1. Also, the storage unit 9 stores print data, and various settings information. The communication unit 4 is a controller for communicating with an external device W via a USB cable. The external device W is a well-known information processing device, such as a PC, a tablet computer, or a smartphone.

Next, a printing operation performed on the printing device 1 will be described. The printing device 1 rotates the rotatable bodies 52, 53, and 54 to draw the film 46 off the first tape roll 41. The print head 6 transfers ink from the ink ribbon 48 to the film 46 drawn off the first tape roll 41 to print characters thereon. More specifically, the driver IC 62 energizes one or more selected elements 61 in the print head 6 on the basis of print data. The energized elements 61 apply thermal energy to areas of the print target F contacting the energized elements 61. Through this process, the printing device 1 forms a pixel row aligned in a main scanning direction X in correspondence with the array of elements 61. The printing device 1 intermittently energizes elements 61 a plurality of times while conveying the print target F downstream in the conveying direction TR by driving the motor 51 to rotate the rotatable bodies 52, 53, and 54. As a result, the printing device 1 forms a plurality of lines juxtaposed on the print target F in a direction orthogonal to the direction in which pixels are aligned in one line image. The plurality of lines forms a print image on the print target F in a shade that depends on the formation or non-formation of each pixel. In the meantime, the rotatable body 54 and pressure roller 45 draw the double-sided adhesive tape 47 off the second tape roll 42 while pressing the printed film 46 against the double-sided adhesive tape 47 to form the print target F. The print target F is then cut into a label by the cutting unit 11. The above operation will be called a "printing operation."

In the following description, the direction in which the elements 61 are aligned will be called the "main scanning direction X," and the printing unit corresponding to a single pixel row extending in the main scanning direction X will be called a "line." The direction in which a plurality of lines is juxtaposed will be called a "sub-scanning direction Y." The sub-scanning direction Y is defined by the conveying direction TR. Printing units corresponding to individual elements 61 will be called "pixels" or "dots." Printing units that result from dividing a "dot" into a plurality of parts in the sub-scanning direction Y will be called "sub-dots." A printing unit corresponding to a row of sub-dots aligned in the main scanning direction X will be called a "sub-line."

Next, a printing process performed on the printing device 1 will be described with reference to FIGS. 3 through 18 using an input image G shown in FIG. 4 as a specific example. The input image G is the image to be printed on the print target F, as illustrated in FIG. 4. In FIG. 4, the left-right direction of the input image G corresponds to the main scanning direction X, while the up-down direction of the input image G corresponds to the sub-scanning direction Y. The left side of the input image G corresponds to a first side X1 in the main scanning direction X while the right side of the input image G corresponds to a second side X2 in the main scanning direction X. The top of the input image G corresponds to a downstream side Y1 in the sub-scanning direction Y, and the bottom of the input image G corresponds to an upstream side Y2 in the sub-scanning direction Y. The input image G includes a rectangular border G1, and a text area G2. The text area G2 includes the alphabetic characters ABCDEF arranged in two rows. Within the printing region defined by the print data, areas configured of sub-dots whose print data is ON (an ON value) will be called "printing areas," while areas configured of sub-dots whose print data is OFF (an OFF value) will be called "non-printing areas." In the present embodiment, the area outside the printing region is also considered a non-printing area.

The user selects an input image G to be printed, specifies at least one from the group of a feature area, a target area, and a non-target area as necessary, and subsequently inputs a start instruction via the input unit 3. A feature area is a distinctive part of the input image G, such as a barcode, that should not be subjected to editing and conversion processes described later. A target area is a portion of the input image G to which the user has designated for application of the editing and conversion processes. In the example of FIG. 4, areas P1 and P2 of the rectangular border G1 extending along the main scanning direction X have been designated target areas. A non-target area is part of the input image G that the user has designated not to be subjected to the editing and conversion processes. In the example of FIG. 4, an area P3 including the G2 has been designated a non-target area.

When detecting a start instruction, the CPU 7 reads the print data editing program for executing a printing process from the storage unit 9 into the RAM 8. The CPU 7 executes the printing process having the following steps according to instructions included in this print data editing program. Various data obtained in the course of the printing process is stored in the storage unit 9 as appropriate. Hereinafter, "step" will be abbreviated as "S". In FIGS. 5, 10-12, and 16-18, some of the sub-dots corresponding to print data are depicted in a matrix. Sub-dots specified as ON in the print data are depicted as shaded, while sub-dots specified as OFF in the print data are left white. The left-right direction and up-down direction in these drawings correspond to the main scanning direction X and sub-scanning direction Y, respectively. Column names represented by numbers denote identification numbers assigned to each of the elements 61 in order from the first side X1 toward the second side X2 in the main scanning direction X. Row names represented by numbers denote identification numbers for each line to be printed by the elements 61. The printing device 1 forms images on the print target F in ascending order of line numbers.

Figure 3:
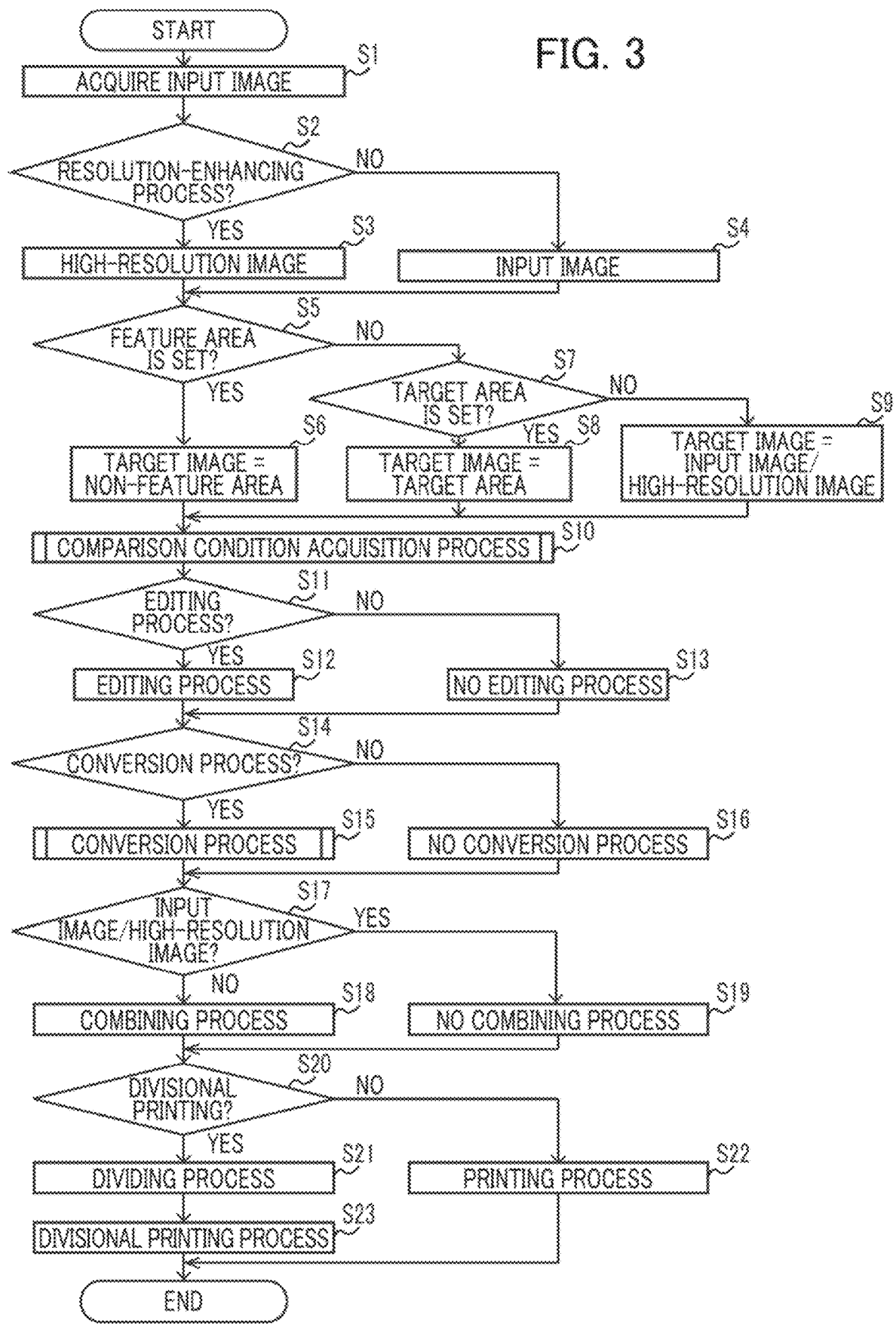
FIG. 3 is a flowchart of a printing process executed in the printing device 1.
Figure 4:
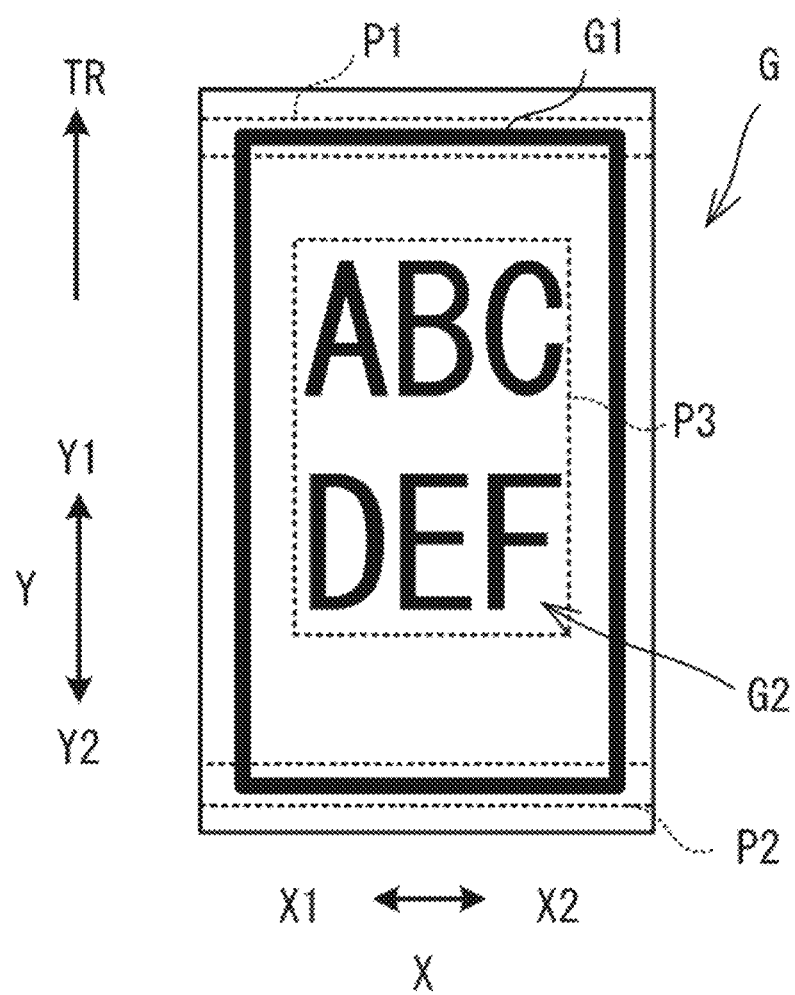
FIG. 4 is a view for explaining an input image G.

In S1 of FIG. 3, the CPU 7 acquires image data representing the input image G. The image data is data corresponding to the plurality of elements 61 aligned in the main scanning direction X. Here, the CPU 7 may acquire image data from the external device W via the communication unit 4, for example. This image data may be generated by the external device W and may have a higher resolution in the sub-scanning direction Y than the resolution defined by the elements 61. The CPU 7 may also acquire image data generated by the external device W that has a resolution no greater than the resolution in the sub-scanning direction Y defined by the elements 61. The CPU 7 may also acquire image data from the storage unit 9 or image data edited through operations on the input unit 3.

In S2 the CPU 7 determines whether to perform a resolution-enhancing process. The resolution-enhancing process is performed on the image data acquired in S1 that represents the input image Gin order to increase the resolution of the image data in the sub-scanning direction Y by dividing each line in the sub-scanning direction Y. Here, the CPU 7 does not perform the resolution-enhancing process when the image data acquired in S1 was generated by the external device W and has a higher resolution in the sub-scanning direction Y than the resolution defined by the elements 61, for example. The CPU 7 performs the resolution-enhancing process when the image data acquired in S1 has a resolution in the sub-scanning direction Y no greater than the resolution defined by the elements 61, for example.

Figure 5:
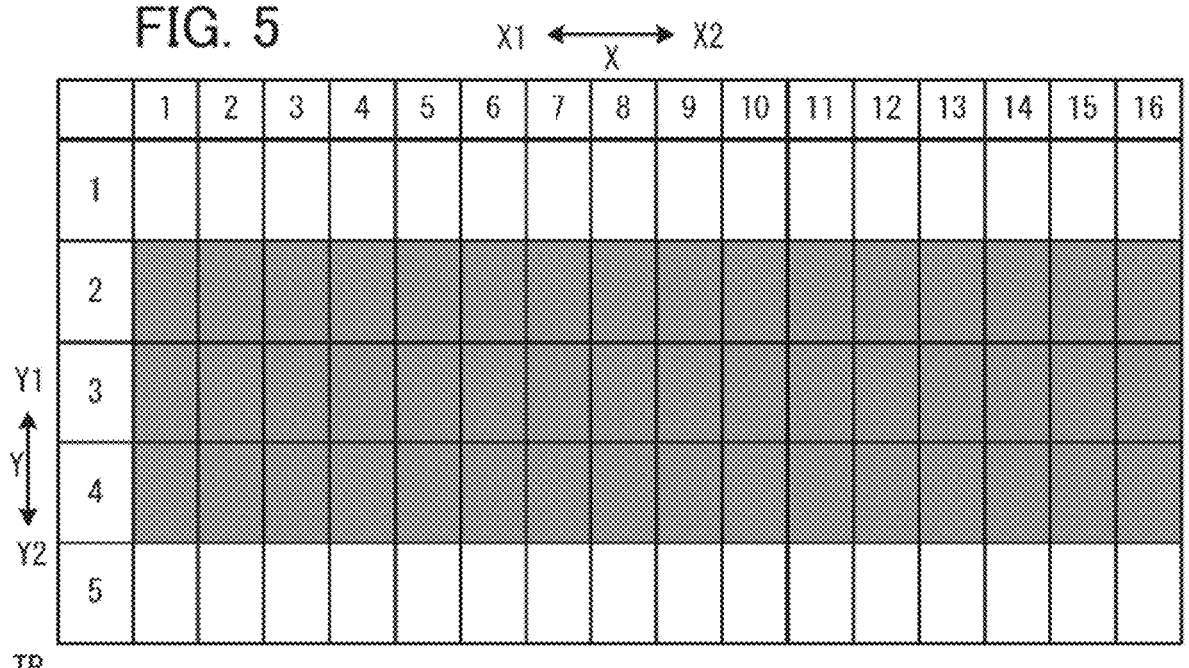
FIG. 5 is a view for explaining a process to generate a high-resolution image.
Figure 5:
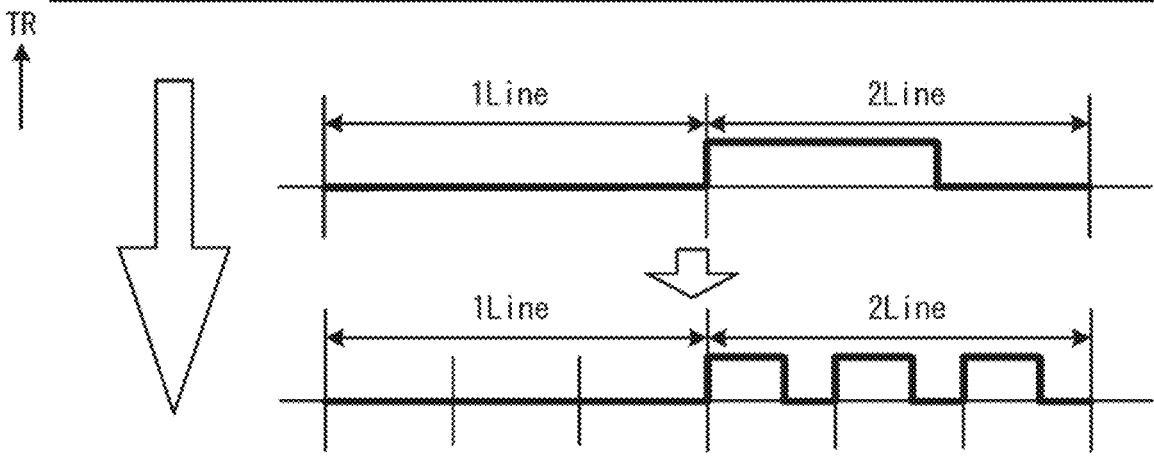

When the CPU 7 determines that the resolution-enhancing process is to be executed (S2: YES), in S3 the CPU 7 performs the resolution-enhancing process to increase the resolution of the image data in the sub-scanning direction Y by dividing each line in the sub-scanning direction Y. In the example of FIG. 5, the CPU 7 divides each line into three equal parts in the sub-scanning direction Y. The number of divisions in each line may be modified as needed. By dividing each line equally in the sub-scanning direction Y, the printing start timings for the sub-lines are set to equal periods. Here, three consecutive sub-dots in the sub-scanning direction Y correspond to one dot. The CPU 7 sets, as the printing area, all sub-dots produced by dividing a dot of the printing area. On the other hand, the CPU 7 sets, as the non-printing area, all sub-dots produced by dividing a dot of the non-printing area. When the CPU 7 determines that the resolution-enhancing process will not be executed (S2: NO), in S4 the CPU 7 performs no processing on the input image G acquired in S1.

Following either S3 or S4, in S5 the CPU 7 determines whether a feature area has been set in the input image G acquired in S1. If a feature area has been set in the input image G (S5: YES), in S6 the CPU 7 sets non-feature areas as the target image to be subjected to an editing process. Non-feature areas are the areas of the high-resolution image produced in S3 or the areas obtained by excluding the set feature areas from the input image G of S4. That is, the process in FIG. 6 configures the target image so that if a specific pattern is included in the input image G, the editing process is not performed on that specific pattern.

Figure 6:
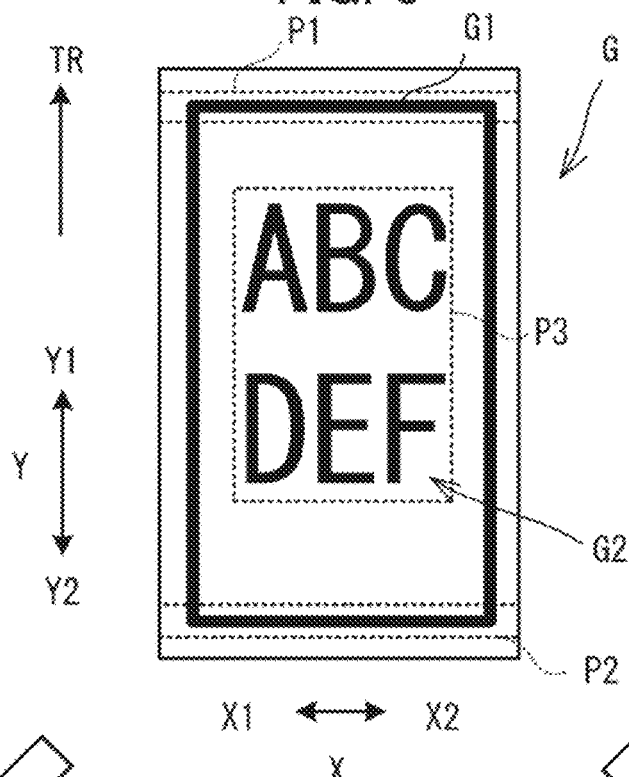
FIG. 6 is a view for explaining a setting method for a target image.
Figure 6:
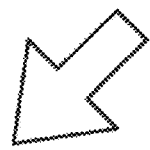
Figure 6:
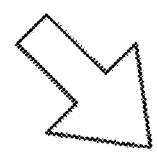
Figure 6:
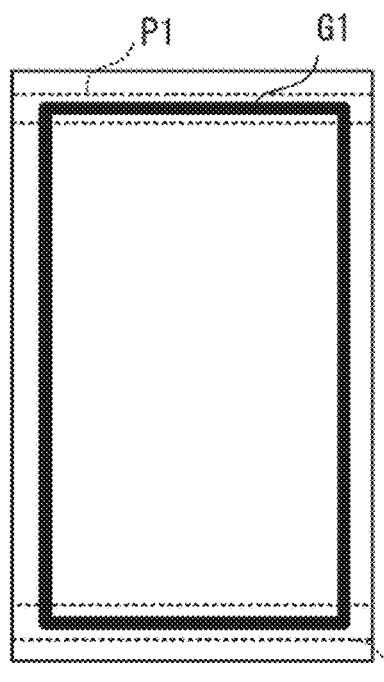
Figure 6:
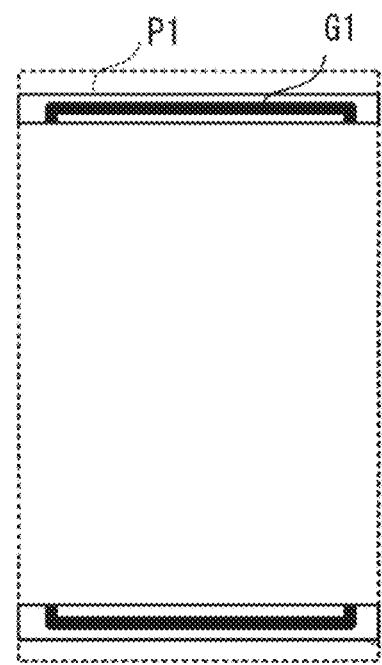

If a feature area has not been set in the input image G (S5: NO), in S7 the CPU 7 determines whether a target area has been set in the input image G acquired in S1. If a target area such as the target areas P1 and P2 has been set in the input image G (S7: YES), in S8 the CPU 7 sets these target areas P1 and P2 as the target image, as illustrated in FIG. 6. The process in S8 sets the target image so that when target areas P1 and P2 are set in the input image G, the editing process is executed only on the target areas P1 and P2 and not on non-target areas, i.e., areas other than the target areas P1 and P2.

In this example, a non-target area P3 has been set in the input image G (S7: YES). In this case, the CPU 7 determines that areas other than the non-target area P3 have been set as the target area (S7: YES). Accordingly, in S8 the CPU 7 sets, as the target image, an area H obtained by excluding the non-target area P3 either from the high-resolution image produced in S3 or from the input image G of S4. The process in S8 sets the target image so that when a non-target area P3 has been designated in the input image G, the editing process is not executed on the non-target area P3 but is only executed on the area H excluding the non-target area P3. If no target areas have been set in the input image G (S7: NO), in S9 the CPU 7 sets the high-resolution image produced in S3 or the input image G of S4 as the target image.

Following S6, S8, or S9, in S10 the CPU 7 performs a comparison condition acquisition process. The comparison condition acquisition process is performed to acquire a condition used to determine whether to perform the editing process. In this embodiment, the CPU 7 acquires, as factors used in the condition for determining whether to perform the editing process, the printing speed when the editing process is performed and the printing speed when the editing process is not performed. The editing process is performed to reduce the peak number of elements 61 to be energized (hereinafter referred to as the "number of ON dots") and involves moving a plurality of sub-dots in a given line in the sub-scanning direction Y according to a predetermined rule in order to distribute the sub-dots among a plurality of lines.

Figure 7:
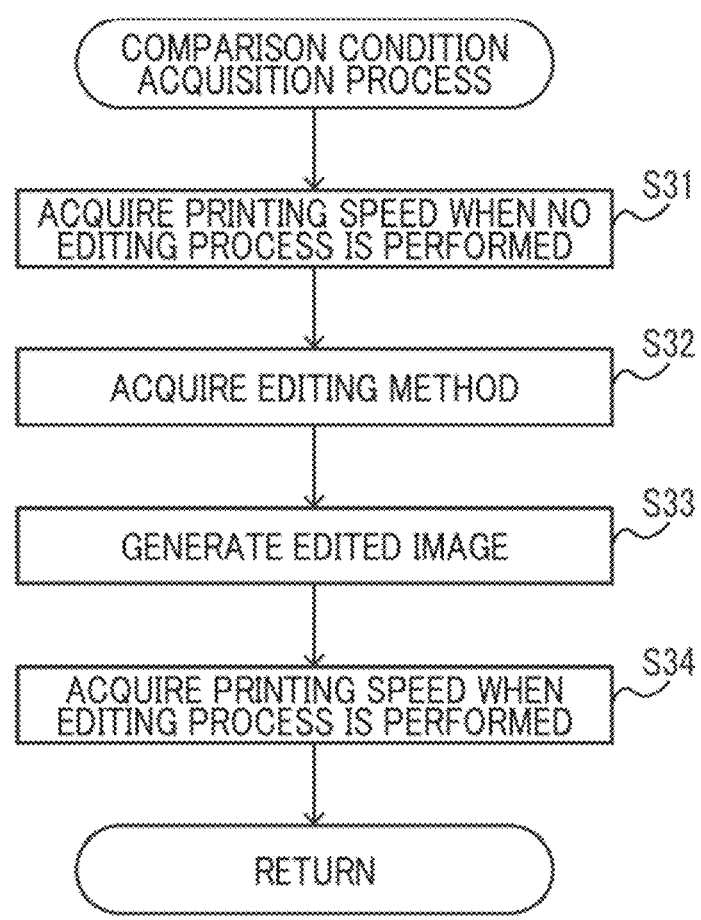
FIG. 7 is a flowchart of a comparison condition acquisition process executed in the printing process.

As shown in FIG. 7, in S31 of the comparison condition acquisition process the CPU 7 acquires the printing speed when no editing process is performed. When a line has a greater number of ON dots than a threshold value, the CPU 7 divides the elements 61 for that line into a plurality of blocks. The printing device 1 then prints one line image by energizing the blocks at different timings, i.e., by dividing energization of the elements 61 into a plurality of times corresponding to the number of blocks. Printing performed in this manner is called "divisional printing." The printing speed in divisional printing is slower than that when divisional printing is not performed depending on the number of lines for which divisional printing is performed and the number of blocks in those lines. The CPU 7 acquires the printing speed when no editing process is performed by taking into account the number of lines and blocks to be used in divisional printing.

In S32 the CPU 7 acquires an editing method to be used in the current editing process from among a plurality of editing methods. This editing method may be specified by the user or selected by the CPU 7 based on the type, size, and the like of the input image G. In the present embodiment, the printing device 1 can select one of six different types of editing methods. Here, sample cases of applying each of these six types of editing methods to an input image G will be described with reference to FIG. 8.

The first through fourth editing methods all divide the target image into a plurality of partial images each having one or more units of columns, and print data is edited by shifting each of the partial images in the sub-scanning direction Y by a slide amount corresponding to that partial image. More specifically, the CPU 7 divides the target image into J rectangular partial images (where J is a natural number) that are elongated in the sub-scanning direction Y and moves each rectangular partial image in the sub-scanning direction Y within a range from an initial position indicated by the dotted line PM. This range satisfies editing conditions including the three conditions described below. Here, J may be set as needed, but is 10 in the present embodiment. When the target image includes part of a border whose longitudinal direction is parallel to the sub-scanning direction Y, as in the portions of the rectangular border G1 in the input image G that extend in the sub-scanning direction Y, the CPU 7 may adjust the length of the rectangular partial image in the main scanning direction X such that the border portion whose longitudinal direction is parallel to the sub-scanning direction Y is not arranged on the boundary between two rectangular partial images neighboring in the main scanning direction X. Note that the length of each rectangular partial image in the sub-scanning direction Y may be the same or different from each other.

The first condition is that when comparing the target image and print image by column units, each of which includes a plurality of dots aligned continuously in the sub-scanning direction Y partially or entirely from an upstream end DE on the upstream side Y2 in the sub-scanning direction Y to a downstream end UE on the downstream side Y1 in the sub-scanning direction Y, coincidence between an image included in each column of the print image and an image included in the corresponding column of the target image is maximized either when the column of the print image is at the same position as the corresponding column of the target image or when the column of the print image has been shifted in the sub-scanning direction Y by a corresponding shift amount relative to the corresponding column of the target image, and the maximum value of the absolute values of the shift amounts for the plurality of columns is at least one dot.

The coincidence is a value obtained by dividing the number of sub-dots whose ON/OFF values match, when comparing ON/OFF values of sub-dots in the column at the same position in the main scanning direction X for both the target image and print image, by the number of sub-dots in that column. The coincidence is a number between 0 and 1. The shift amounts for the plurality of columns are each an amount of shift for maximizing the coincidence for the corresponding column. The shift amount is expressed by a positive value when the partial image is shifted toward the downstream side Y1 in the sub-scanning direction Y and a negative value when the partial image is shifted toward the upstream side Y2 in the sub-scanning direction Y.

The second condition is that an absolute difference value for any two neighboring columns in the main scanning direction X is one dot or less. The absolute difference value is the absolute value of the difference in shift amounts between given two columns. The third condition is that at least one of the absolute difference values for all the possible combinations of two columns is less than one dot, represented by sub-dots formed by dividing a dot into a plurality of equal parts in the sub-scanning direction Y.

Figure 18:
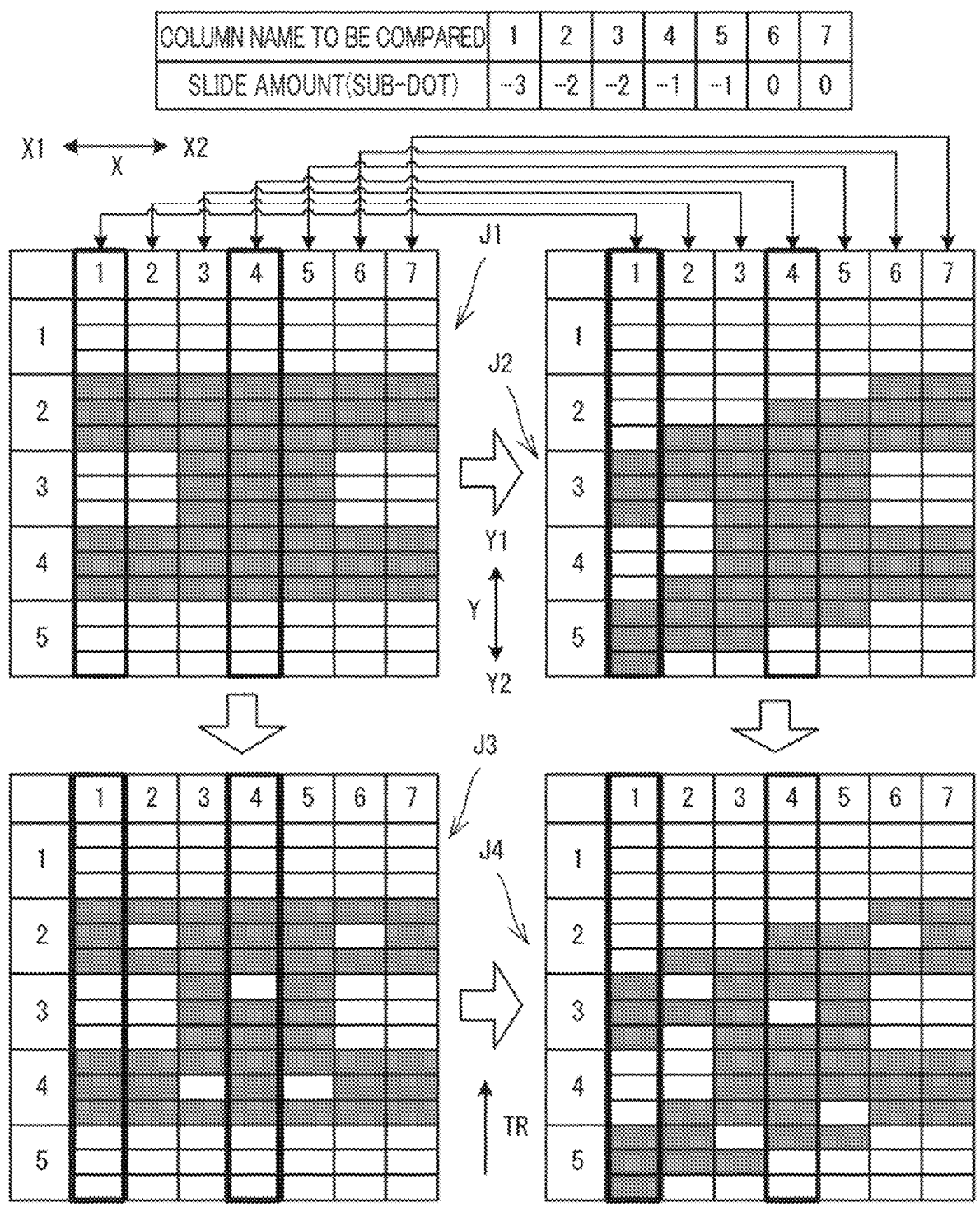
FIG. 18 is a view for explaining a first condition, a second condition, and the third condition that are met in the editing method.

For example, when comparing the ON/OFF values of sub-dots in columns at the same positions in the main scanning direction X for each column in an input image J1 and a print image J2 shown in FIG. 18, the coincidence is the maximum value, i.e., 1 when dots are shifted −3 sub-dots, −2 sub-dots, −2 sub-dots, −1 sub-dot, −1 sub-dot, 0 sub-dots, and 0 sub-dots in the sub-scanning direction Y for columns 1 through 7. Since three sub-dots are equivalent to one dot in this example, the input image J1 and print image J2 satisfy the first condition. Further, since the absolute value of the difference in shift amounts between any two neighboring columns in the main scanning direction X (i.e., the absolute difference value for any two neighboring columns in the main scanning direction X) is either 1 sub-dot or 0 sub-dots, the input image J1 and print image J2 satisfy both the second condition and third condition.

On the other hand, when comparing columns 1 through 7 in sequence from the first side X1 in the main scanning direction X between the input image J1 and a print image J4, which is generated in a conversion process (described later) executed after execution of the editing process to convert some of the print data in the printing areas from ON to OFF, the shift amounts are the same but the coincidence for the columns with identification numbers 2 through 6 is $^{14}/_{15}$ each, which is smaller than 1. Since the shift amount for each column when comparing the input image J1 with the print image J4 is identical to the shift amount for each column when comparing the input image J1 to the print image J2, the input image J1 and print image J4 also satisfy each of the first, second, and third conditions.

The length of one dot in the sub-scanning direction Y differs according to the resolution of the print image. The length of one dot in the sub-scanning direction Y also depends on the resolution of the elements 61 but falls within an approximate range of 20 to 170 μm. Hence, the second condition may be that the absolute value of the difference in shift amounts between any two columns that are adjacent in the main scanning direction X (i.e., the absolute difference value for any two neighboring columns in the main scanning direction X) be less than or equal to 150 μm. In the present embodiment, the CPU 7 further edits the target image such that the absolute values of shift amounts in the center region of the main scanning direction X are minimum. Areas of the input image J1 that correspond to consecutive print areas are also consecutive in the print images J2 and J4.

Figure 8:
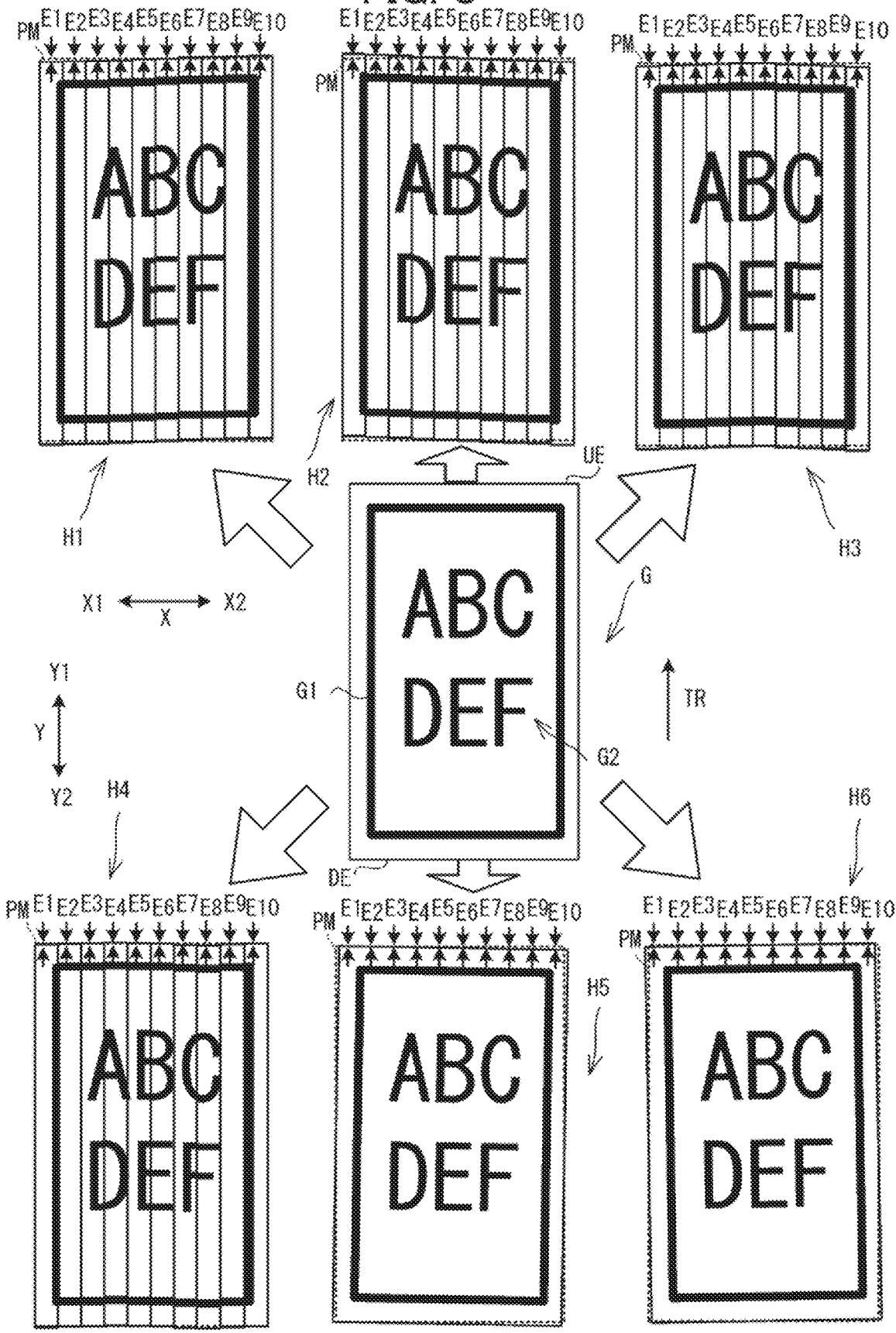
FIG. 8 is a view for explaining an editing method.

In the first editing method, if the slide amount for shifting the partial image toward the upstream side Y2 in the sub-scanning direction Y is a negative value and the slide amount for shifting the partial image toward the downstream side Y1 in the sub-scanning direction Y is a positive value, the target image is edited such that the slide amount is a larger value toward the second side X2 from the first side X1 in the main scanning direction X, i.e., in the direction 90 degrees clockwise from the downstream side Y1 in the sub-scanning direction Y. More specifically, when the first editing method is applied to the input image G, as shown in FIG. 8, the CPU 7 sets slide amounts E1 through E10 for first through tenth rectangular partial images beginning from the first side X1 in the main scanning direction X to −5 sub-dots, −4 sub-dots, −3 sub-dots, −2 sub-dots, −1 sub-dot, 0 sub-dots, 1 sub-dot, 2 sub-dots, 3 sub-dots, and 4 sub-dots, respectively, to generate an edited image H1. In the first editing method, the difference between slide amounts for any two neighboring columns is 1 sub-dot and is a value less than one dot, represented by sub-dots formed by dividing a dot into a plurality of equal parts in the sub-scanning direction Y. The maximum value of the absolute values of the slide amounts is 5 sub-dots, which is greater than or equal to one dot.

Similarly, in the second editing method, if the slide amount for shifting the partial image toward the upstream side Y2 in the sub-scanning direction Y is a negative value and the slide amount for shifting the partial image toward the downstream side Y1 in the sub-scanning direction Y is a positive value, the target image is edited such that the slide amount is a smaller value toward the second side X2 from the first side X1 in the main scanning direction X, i.e., in the direction 90 degrees clockwise from the downstream side Y1 in the sub-scanning direction Y. More specifically, when the second editing method is applied to the input image G, the CPU 7 sets the slide amounts E1 through E10 for the first through tenth rectangular partial images beginning from the first side X1 in the main scanning direction X to 5 sub-dots, 4 sub-dots, 3 sub-dots, 2 sub-dots, 1 sub-dot, 0 sub-dots, −1 sub-dot, −2 sub-dots, −3 sub-dots, and −4 sub-dots, respectively, to generate an edited image H2.

In the third editing method, the target image is edited such that there is only one extreme value among slide amounts in the main scanning direction X. More specifically, when the third editing method is applied to the input image G, the CPU 7 sets the slide amounts E1 through E10 for the first through tenth rectangular partial images beginning from the first side X1 in the main scanning direction X to −4 sub-dots, −3 sub-dots, −2 sub-dots, −1 sub-dot, 0 sub-dots, −1 sub-dots, −2 sub-dots, −3 sub-dots, −4 sub-dots, and −5 sub-dots, respectively, to generate an edited image H3. The extreme value in the third editing method is 0 sub-dots, which corresponds to the fifth partial image from the left side (the first side X1).

In the fourth editing method, the target image is edited such that there are two or more extreme values among slide amounts in the main scanning direction X. More specifically, when the fourth editing method is applied to the target image G the CPU 7 sets the slide amounts E1 through E10 for the first through tenth rectangular partial images beginning from the first side X1 in the main scanning direction X to −3 sub-dots, −2 sub-dots, −1 sub-dots, 0 sub-dots, 0 sub-dots, −1 sub-dots, −2 sub-dots, −3 sub-dots, −2 sub-dots, and −1 sub-dots, respectively, to generate an edited image H4. The extreme values in the fourth editing method are 0 sub-dots corresponding to the fourth and fifth partial images from the left side (the first side X1) and −3 sub-dots corresponding to the eighth partial image from the left side (the first side X1).

In the fifth editing method, the target image is rotated clockwise around a reference by a prescribed angle. In the sixth editing method, the target image is rotated counterclockwise around a reference by a prescribed angle. The reference in the present embodiment is set, for example, to the center of the target image in consideration for minimizing the absolute value of slide amounts in the center region relative to the main scanning direction X. A suitable prescribed angle is set based on the size of the print target F, the target image, and the like. For example, the prescribed angle is a value between 0 and 10 degrees, and preferably a value less than or equal to 1 degree, and more preferably a value less than or equal to 0.5 degrees. The CPU 7 generates an edited image H5 when applying the fifth editing method to the input image G with a prescribed angle of 1 degree and generates an edited image H6 when applying the sixth editing method to the input image G with a prescribed angle of 1 degree.

When comparing slide amounts E1 through E10 of partial images for a case in which a target image is divided into J rectangular images elongated in the sub-scanning direction Y, as in the first through fourth editing methods, all of the first, second, and third conditions are satisfied both in the edited image H5 to which the fifth editing method has been applied and in the edited image H6 to which the sixth editing method has been applied. In a case where the fifth editing method or sixth editing method is applied to the target image, the following conditions are met: the coincidence with the print image is maximized when the target image is rotated a prescribed angle around the reference; and moving amounts of the farthest areas of the target image from the reference are more than 1 dot.

In S33 the CPU 7 generates an edited image using the editing method acquired in S32 to edit the target image. In S34 the CPU 7 acquires the printing speed for printing the edited image generated in S33. The CPU 7 acquires the printing speed when the editing process is performed while accounting for the number of lines and number of blocks to be used in divisional printing. Subsequently, the CPU 7 ends the comparison condition acquisition process described above and returns to the printing process of FIG. 3.

Following the process in S10, in S11 the CPU 7 determines whether to execute the editing process on the target image. The criteria for determining whether to execute the editing process on the target image may be set as appropriate. For example, the CPU 7 may use a criterion that the user selects from among a plurality of determination criteria or the CPU 7 itself may select the determination criterion based on the type, size, and the like of the input image G.

For example, the CPU 7 may determine that the editing process is to be executed when the target image includes a prescribed number or more of borders extending at least a prescribed length in the main scanning direction X. The prescribed length and prescribed number of borders may be set as appropriate. In this example, the areas P1 and P2 of the rectangular border G1 that extend in the main scanning direction X are treated as borders. For example, if the prescribed length is set to half the dimension of the target image in the main scanning direction X and the prescribed number is 3, the CPU 7 determines not to execute the editing process since the only borders longer than half the dimension of the target image in the main scanning direction X are the two borders in the areas P1 and P2.

Alternatively, the CPU 7 may execute the editing process when the image data contains a line in which the ratio of the peak current required in the print head 6 to the maximum current that can be outputted from the power supply 10 is greater than a threshold value. Alternatively, the CPU 7 may execute the editing process when printing based on edited print data produced from the editing process results in a faster printing speed than when editing by the editing process is not performed. In other words, the CPU 7 may execute the editing process when the printing speed acquired in S34 is faster than the printing speed acquired in S31. If the peak number of ON dots in the edited image becomes less than that in the target image, then the printing speed acquired in S34 may be faster than the printing speed acquired in S31.

If the CPU 7 determines that the editing process is to be executed (S11: YES), in S12 the CPU 7 edits the target image using the editing method acquired in S32. For example, if the first editing method is to be applied to the target image H, as shown in FIG. 8, the CPU 7 edits the print data to produce data representing the edited image H1. When the editing process is executed on a target image that was set in S9, the CPU 7 performs the editing process on the entire input image G or the entire high-resolution image. When the editing process is executed on a target image that was set in S6 or S8, the CPU 7 performs the editing process on a portion of the input image G or a portion of the high-resolution image. If the target image was set to target areas P1 and P2 in S8, the CPU 7 executes the editing process only on a partial range of the input image G or high-resolution image in the sub-scanning direction Y. If the editing process is not to be executed (S11: NO), in S13 the CPU 7 generates print data from the image data without editing the target image.

Following the process in S12 or S13, in S14 the CPU 7 determines whether to perform a conversion process. The conversion process is performed to convert the print data in order to reduce the number of ON dots in a line. The criterion for determining whether to perform the conversion process may be preset by the user or the CPU 7 may automatically determine the criterion based on the type and size of print data, the printing speed, the printing quality, the number of ON dots, and the like. If the CPU 7 determines not to perform the conversion process (S14: NO), in S16 the CPU 7 does not perform the conversion process on the target image produced in S12 or S13. If the CPU 7 determines that the conversion process is to be performed (S14: YES), in S15 the CPU 7 performs a conversion process on the target image produced in S12 or S13.

When the printing unit obtained by dividing a dot defined by the elements 61 into M parts in the sub-scanning direction Y is defined as a sub-dot (where M is an integer of 2 or greater), a plurality of sub-dots aligned in the main scanning direction X is defined as a sub-line, the sub-dot whose print data is ON is defined as a printing area, and the area outside the printing region or the sub-dot whose print data is OFF is defined as a non-printing area, the CPU 7 changes the image data or print data for one or more sub-dots in each of all the sub-lines of one or more lines in the printing area from ON to OFF in the conversion process. Hereinafter, the sub-dots whose image data or print data is changed from ON to OFF in the conversion process will be called the "conversion sub-dots".

Figure 9:
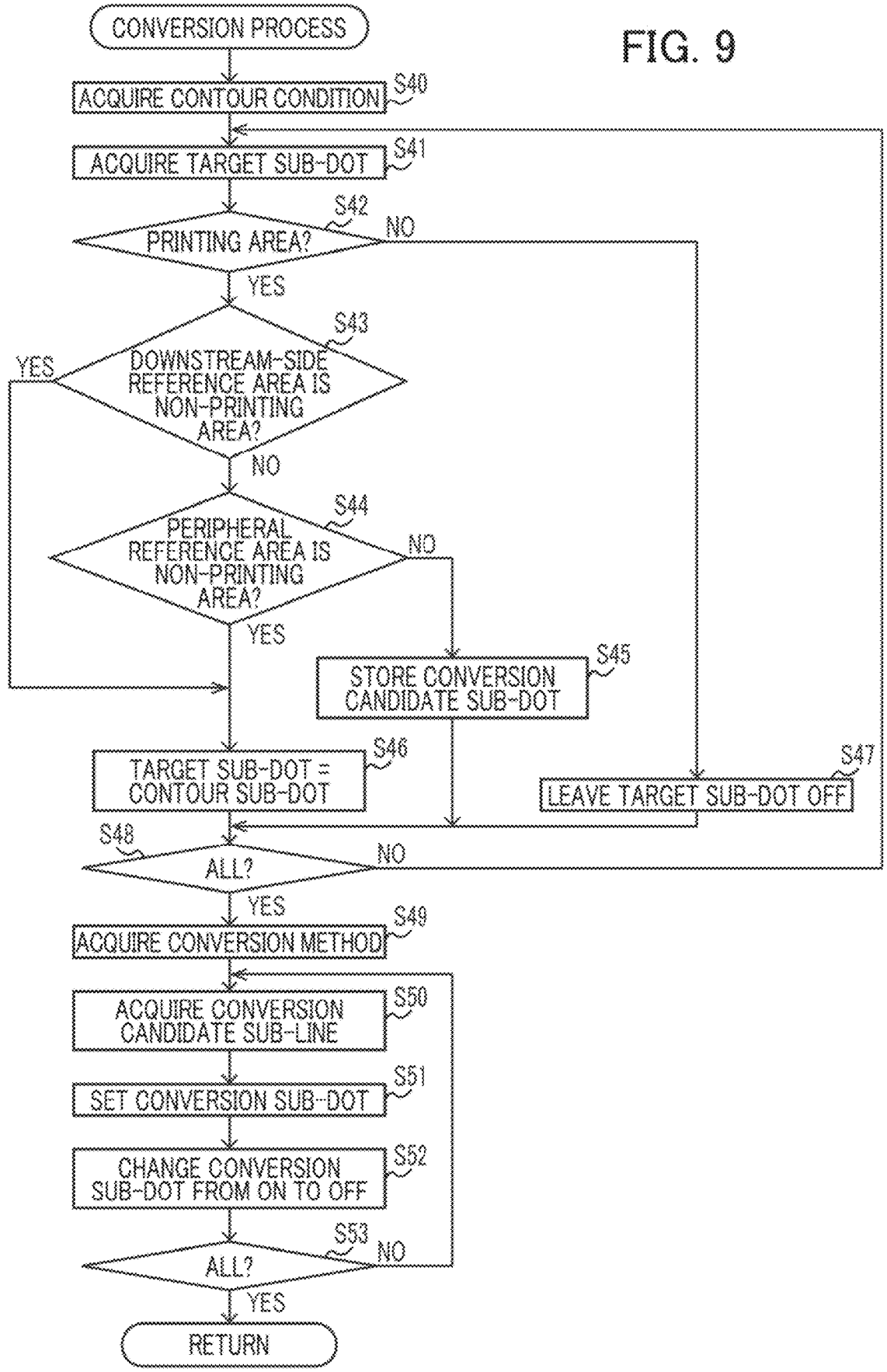
FIG. 9 is a flowchart of a conversion process executed in the printing process.

Next, the conversion process will be described with reference to the flowchart in FIG. 9 and using the schematic drawings in FIGS. 10 through 12 that show areas of a print image represented by print data. In S40 of FIG. 9, the CPU 7 acquires a contour condition. In the present embodiment, the printing device 1 can specify whether print data is to be modified for contour areas of printing areas configured of sub-dots whose print data is ON. Specifically, the CPU 7 specifies the range of a contour area that is not to be subjected to the conversion process using variables U, D, L, and R. For a single continuous printing area, the variable U is set for defining the range of the contour on the downstream side Y1 in the sub-scanning direction Y, the variable D is set for defining the range of the contour on the upstream side Y2 in the sub-scanning direction Y, the variable L is set for defining the range of the contour on the first side X1 in the main scanning direction X, and the variable R is set for defining the range of the contour on the second side X2 in the main scanning direction X. The variables U, D, L, and R may be the same value or different values from each other, provided that they are each an integer of 0 or greater. The variables U, D, L, and R may be set by the user or may be set automatically according to the type of the target image and the like. In the present embodiment, the variables U, D, L, and R are 2, 1, 1, and 1, respectively.

In S41 the CPU 7 acquires one sub-dot among the plurality of sub-dots in the print data to be a target sub-dot. For example, the CPU 7 acquires target sub-dots in order from the left side (the first side X1) toward the right side (the second side X2) of the target image and from the top side (the downstream side Y1) toward the bottom side (the upstream side Y2). In S42 the CPU 7 determines whether the target sub-dot is the printing area based on print data for the target sub-dot acquired in S41. If the print data corresponding to the target sub-dot is OFF (S42: NO), in S47 the CPU 7 leaves the print data for that target sub-dot OFF and in S48 determines whether all sub-dots in the print data have been acquired as a target sub-dot in the process of S41. If there remain any sub-dots that have not been acquired in S41 (S48: NO), the CPU 7 returns to S41 and acquires the next target sub-dot in the order of acquisition.

Figure 10:
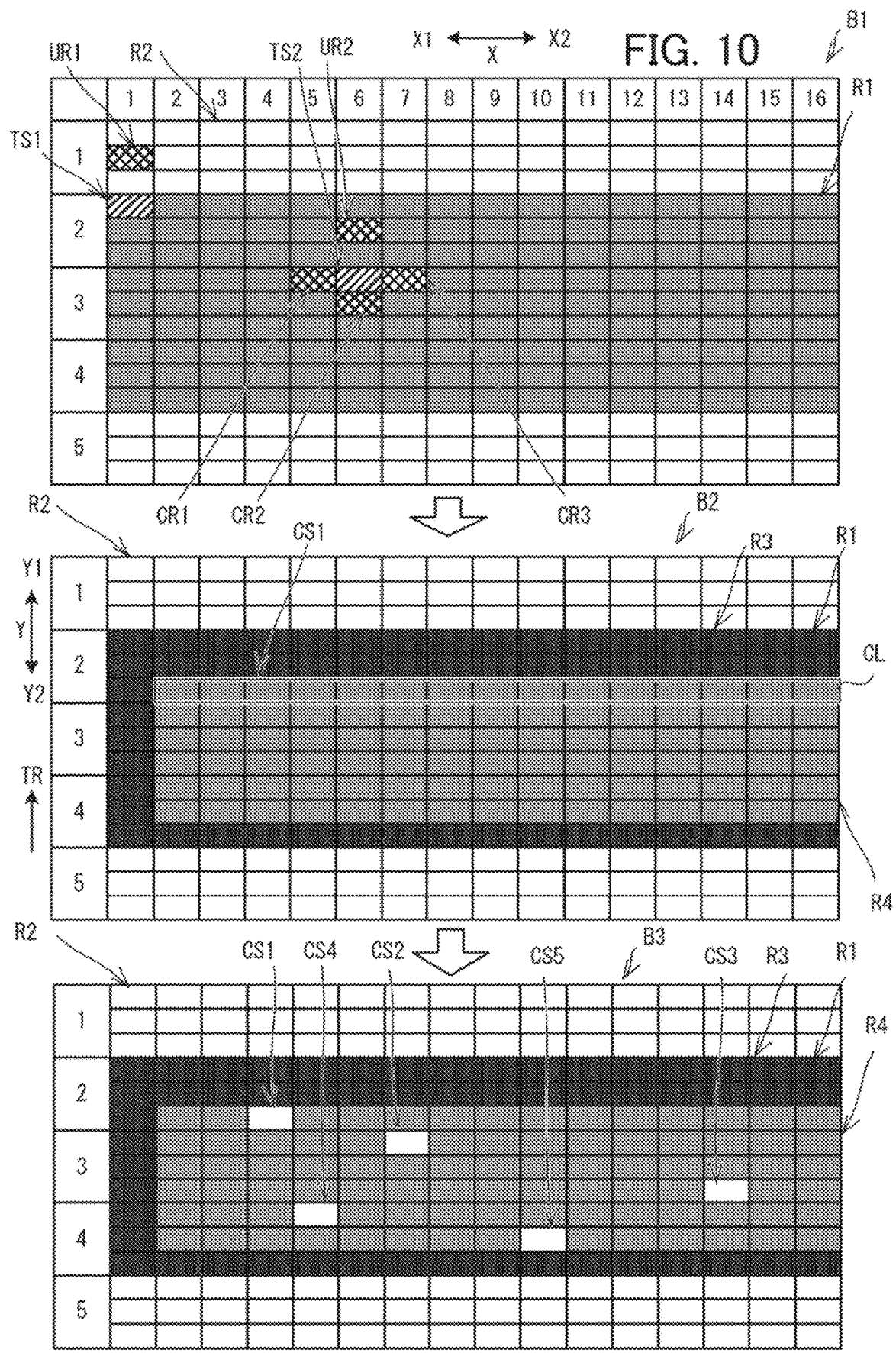
FIG. 10 is a view for explaining the conversion process in a specific example in which an editing process is not performed.
Figure 11:
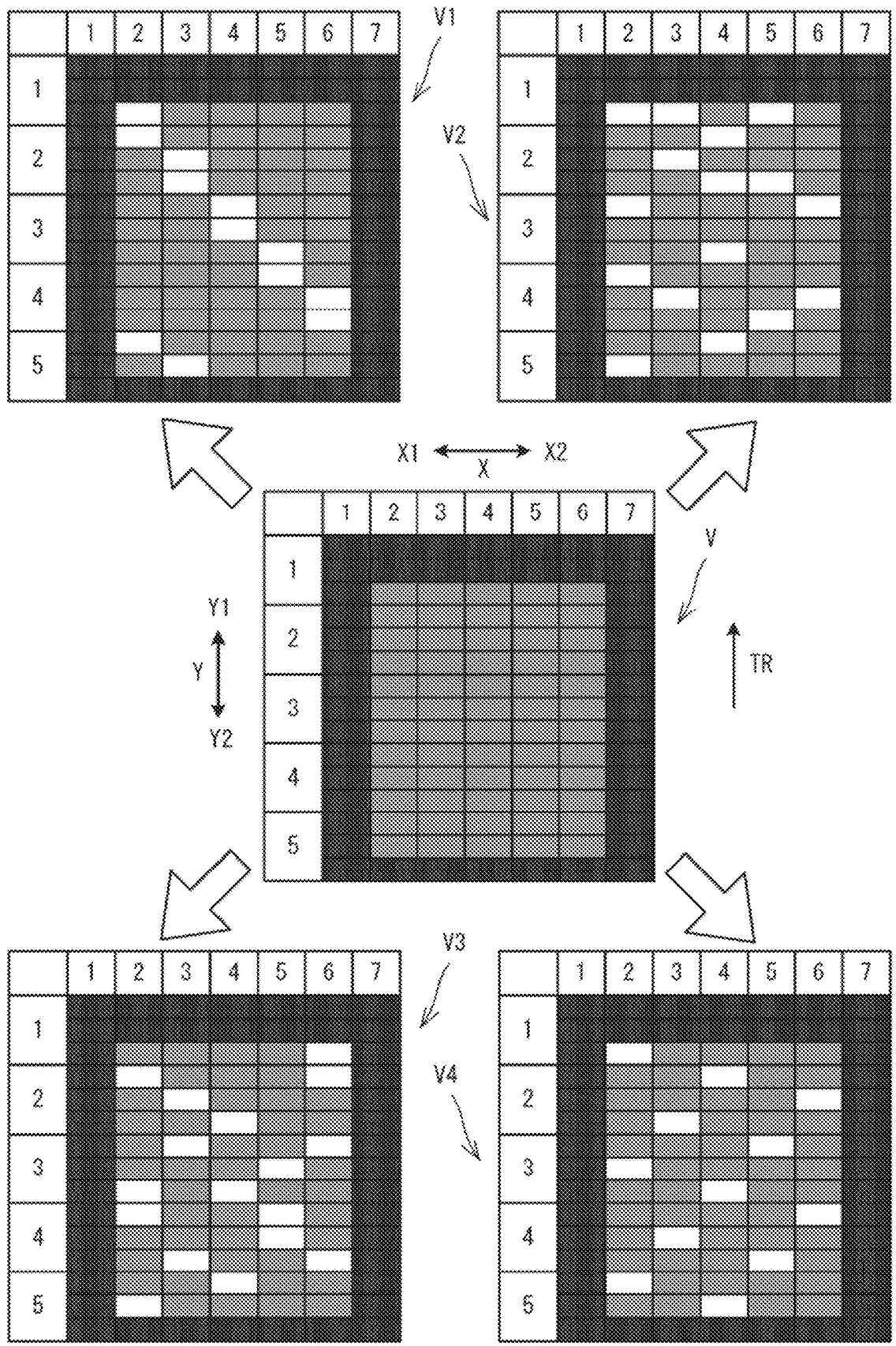
FIG. 11 is a view for explaining an editing method.

In the example of FIG. 10, a target sub-dot TS1 is depicted with diagonal shading lines. Since the print data corresponding to the target sub-dot TS1 is ON (S42: YES), in S43 the CPU 7 determines whether a downstream-side reference area is a non-printing area. The downstream-side reference area is one or more sub-dots located on the downstream side Y1 in the sub-scanning direction Y relative to the target sub-dot. In the present embodiment, the downstream-side reference area is the U-th sub-dot on the downstream side Y1 in the sub-scanning direction Y relative to the target sub-dot. The downstream-side reference area for the target sub-dot TS1 is a sub-dot UR1 depicted with lattice shading. Since the print data for the sub-dot UR1 is OFF (S43: YES), in S46 the CPU 7 determines the target sub-dot TS1 as a contour sub-dot constituting the contour area and thus leaves the print data for the target sub-dot TS1 ON. Subsequently, the CPU 7 advances to S48 described above. In this way, when one target sub-dot among the plurality of sub-dots is a printing area (S42: YES), the CPU 7 sets the reference sub-dot for the target sub-dot to the U-th sub-dot (where U is any integer of 0 or greater) on the downstream side in the sub-scanning direction relative to this target sub-dot. If the reference sub-dot is a non-printing area (S43: YES), the CPU 7 assumes the target sub-dot is a contour sub-dot and in S46 leaves the image data or print data for the contour sub-dot ON.

When a target sub-dot TS2 depicted with diagonal shading lines is acquired in S41 (S42: YES), the downstream-side reference area for the target sub-dot TS2 is a sub-dot UR2 depicted with lattice shading. Since the print data for the sub-dot UR2 is ON (S43: NO), in S44 the CPU 7 determines whether any peripheral reference areas are non-printing areas. The peripheral reference areas are one or more sub-dots surrounding the target sub-dot. For example, the peripheral reference areas include the L-th sub-dot on the first side X1 in the main scanning direction X relative to the target sub-dot, the R-th sub-dot on the second side X2 in the main scanning direction X relative to the target sub-dot, and the D-th sub-dot on the upstream side Y2 in the sub-scanning direction Y relative to the target sub-dot. If at least one of the peripheral reference areas is a non-printing area (S44: YES), the CPU 7 advances to S46 described above. Thus, when one target sub-dot among the plurality of sub-dots is a printing area (S42: YES), in S46 the CPU 7 determines that the target sub-dot is a contour sub-dot when any of the U-th sub-dot on the downstream side Y1 in the sub-scanning direction Y, the D-th sub-dot on the upstream side Y2 in the sub-scanning direction Y, the L-th sub-dot on the first side X1 in the main scanning direction X, and the R-th sub-dot on the second side X2 in the main scanning direction X relative to the target sub-dot is a non-printing area (S43: YES or S44: YES). In this case, in S46 the CPU 7 leaves the image data or print data for the contour sub-dot ON.

The peripheral reference areas for the target sub-dot TS2 are sub-dots CR1, CR2, and CR3 depicted with lattice shading. Since none of the print data for the sub-dots CR1, CR2, and CR3 are OFF in this example (S44: NO), in S45 the CPU 7 stores the target sub-dot TS2 as a conversion candidate sub-dot and advances to S48 described above. Through the process from S41 to S48, sub-dots in a portion of a printing area R1 in a partial image B1 shown in the top of FIG. 10 are set as contour sub-dots constituting the area R3 depicted with dark shading in the partial image B2 shown in the middle of FIG. 10, while sub-dots in a remaining area R4 are set as conversion candidate sub-dots. Thus, when one target sub-dot among the plurality of sub-dots is the printing area (S42: YES), in S45 the CPU 7 sets this target sub-dot as a conversion candidate sub-dot when all of the U-th sub-dot on the downstream side Y1 in the sub-scanning direction Y, D-th sub-dot on the upstream side Y2 in the sub-scanning direction Y, L-th sub-dot on the first side X1 in the main scanning direction X, and R-th sub-dot on the second side X2 in the main scanning direction X relative to the target sub-dot are the printing area (S43: NO and S44: NO). Through the subsequent process in S49 through S53, the CPU 7 changes the print data for one or more conversion candidate sub-dots from ON to OFF in all sub-lines of at least one line within all conversion candidate sub-dots in the image data (S51, S52).

Once all sub-dots have been acquired as target sub-dots in S41 (S48: YES), in S49 the CPU 7 acquires the method of converting the one or more conversion candidate sub-dots that have been stored in S45. The conversion method may be specified by the user or may be selected by the CPU 7 based on the type and size of the input image G, the printing speed, the printing quality, and the like. In the present embodiment, the printing device 1 can select one of four conversion methods.

Next, the four conversion methods when applied to a partial image V will be described with reference to FIG. 11. The partial image V is an image having five dots in the sub-scanning direction Y and seven dots in the main scanning direction X. Among the sub-dots configuring the partial image V, those sub-dots depicted with dark shading have been set as contour sub-dots, while those sub-dots depicted with light shading have been set as conversion candidate sub-dots.

In the first conversion method, print data for the conversion candidate sub-dots is changed from ON to OFF at a ratio of B/C (where B and C are natural numbers) in the main scanning direction X and a ratio of B/C in the sub-scanning direction Y. B/C is appropriately set so as to be a value greater than 0 and less than 1 and is preferably set to a value no greater than 0.5. In the example of FIG. 11, B/C is ⅕. If a fraction is present in the conversion candidate sub-dots along the main scanning direction X and sub-scanning direction Y when applying the first conversion method, as in the partial image V of FIG. 11, the CPU 7 may apply the first conversion method over a range in which the first conversion method can be applied and may apply another method to the remaining area, as in the partial image V1. In consideration for cases in which fractions appear in the conversion candidate sub-dots along the main scanning direction X and sub-scanning direction Y when applying the first conversion method, the CPU 7 may set B/C as the target value and may set the number of conversion sub-dots to be changed from ON to OFF as close as possible to the target value.

In the second conversion method, when print data for a target sub-dot is ON and sub-dots adjacent to the target sub-dot on the upstream side Y2 and downstream side Y1 in the sub-scanning direction Y are conversion sub-dots, the CPU 7 leaves the print data for the target sub-dot ON. That is, the second conversion method converts print data so that no conversion sub-dots to be changed from ON to OFF are continuous in the sub-scanning direction Y, as in the partial image V2 in FIG. 11.

In the third conversion method, when print data for a target sub-dot is ON and at least one sub-dot adjacent to the target sub-dot in the main scanning direction X is a conversion sub-dot, the CPU 7 leaves the print data for the target sub-dot ON. That is, the third conversion method converts print data so that no conversion sub-dots to be changed from ON to OFF are continuous in the main scanning direction X, as in the partial image V3 in FIG. 11.

In the fourth conversion method, when print data for a target sub-dot is ON and at least one of the eight peripheral sub-dots of the target sub-dot is a conversion sub-dot, the CPU 7 leaves the print data for the target sub-dot ON. That is, the fourth conversion method converts print data so that no conversion sub-dots to be changed from ON to OFF are continuous in any of the eight directions. In FIG. 11, the eight directions are toward the upper side, upper-right side, right side, lower-right side, lower side, lower-left side, left side, and upper-left side of the target sub-dot. In the second through fourth conversion methods, the ratio of conversion sub-dots to conversion candidate sub-dots may be set as desired in the main scanning direction X and sub-scanning direction Y.

In S50 the CPU 7 acquires a conversion candidate sub-line, which is one sub-line formed by one or more conversion candidate sub-dots that have been stored in S45, according to a predetermined order. In the present embodiment, the CPU 7 acquires conversion candidate sub-lines in order from the downstream side Y1 in the sub-scanning direction Y. For example, the CPU 7 acquires a conversion candidate sub-line CL farthest on the downstream side Y1 in the sub-scanning direction Y of the area R4 (i.e., the conversion candidate sub-line located the most downstream in the sub-scanning direction Y in the area R4). In S51 the CPU 7 uses the conversion method acquired in S49 to set conversion sub-dots from among the conversion candidate sub-dots in the conversion candidate sub-line acquired in S50. For example, the CPU 7 sets a sub-dot CS1 in the conversion candidate sub-line CL as a conversion sub-dot. In S52 the CPU 7 changes the print data of sub-dots that have been set as conversion sub-dots in S51 from ON to OFF. In S53 the CPU 7 determines whether all conversion candidate sub-lines have been acquired in the process of S50. When there remain any sub-lines that have not yet been acquired in S50 (S53: NO), the CPU 7 returns to S50. Once all conversion candidate sub-lines have been acquired in S50 (S53: YES), the CPU 7 ends the conversion process and returns to the printing process of FIG. 3.

As an example, when the fourth conversion method is applied to the partial image B2 in the middle of FIG. 10, the partial image B2 is converted into a partial image B3 shown in the bottom of FIG. 10 in which print data for conversion sub-dots CS1 through CS5 has been changed from ON to OFF. On the other hand, if the fourth conversion method is applied in S15 to a partial image C1 that has been subjected to the first editing method in S12, the partial image C1 is converted into a partial image C2 in which print data is modified as illustrated in FIG. 12. If the resolution is 165 dpi and the editing process is executed using the second editing method employing the condition that the difference in slide amounts between any two partial images neighboring each other in the main scanning direction X has an absolute value of 150 µm or less, then when performing the editing process and conversion process on a border extending in the main scanning direction X and having a thickness of 1 dot, 2 dots, 3 dots, 4 dots, 6 dots, 8 dots, or 16 dots, as shown in FIG.

13, the CPU 7 can reduce the number of ON dots while inclining the border to a degree that is not visually noticeable.

Figure 13:
FIG. 13 is a view for explaining comparison of an image before and after the editing process and the conversion process are performed on a border included in the image under the condition that the absolute value of the difference in shift amounts between any two rectangular partial images that are adjacent in a main scanning direction X be less than or equal to 150 μm.
Figure 20:
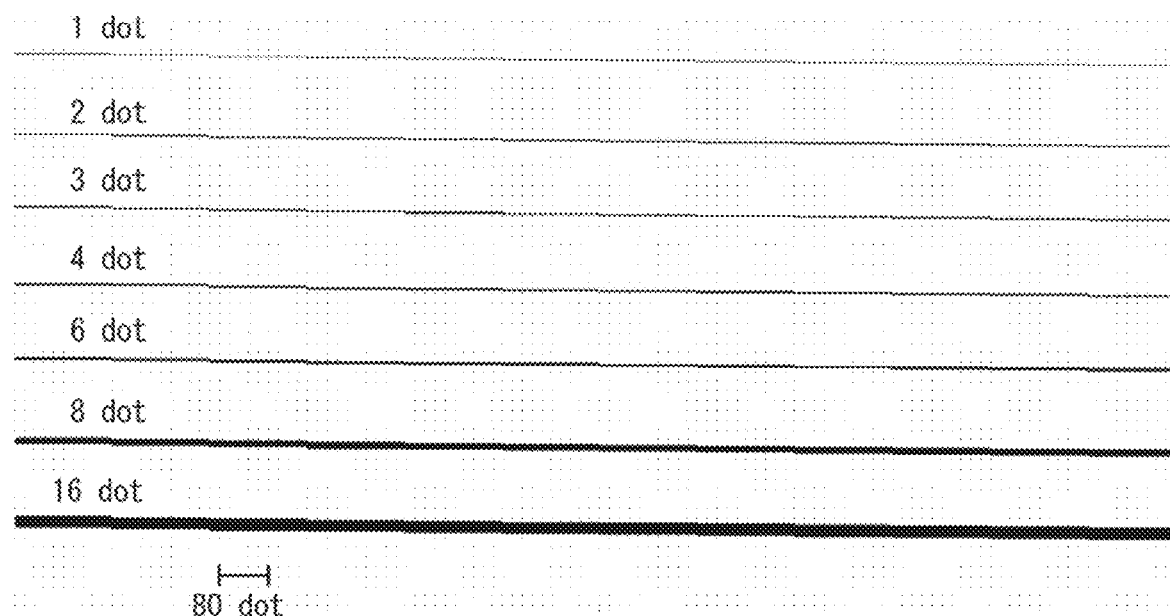
FIG. 20 is a view for explaining comparison of an image before and after the editing process and the conversion process are performed on a border included in the image under the condition that the absolute value of the difference in shift amounts between any two rectangular partial images that are adjacent in the main scanning direction X be less than or equal to 300 μm.

More specifically, edited parts in a print image having conditions shown in FIG. 13 are more difficult to notice than in a print image edited using the second editing method under conditions of a comparative example shown in FIG. 20 in which the resolution is 165 dpi and the difference in slide amounts between any two partial images neighboring each other in the main scanning direction X has an absolute value of 300 μm. Note that the length of one dot in the sub-scanning direction Y when the resolution is 165 dpi is approximately 154 μm. FIGS. 13 and 20 show cases in which the values of U and D are both 3 (equivalent to one dot) and the conversion process is executed using the third conversion method that satisfies the condition of B/C equaling ½.

Figure 14:
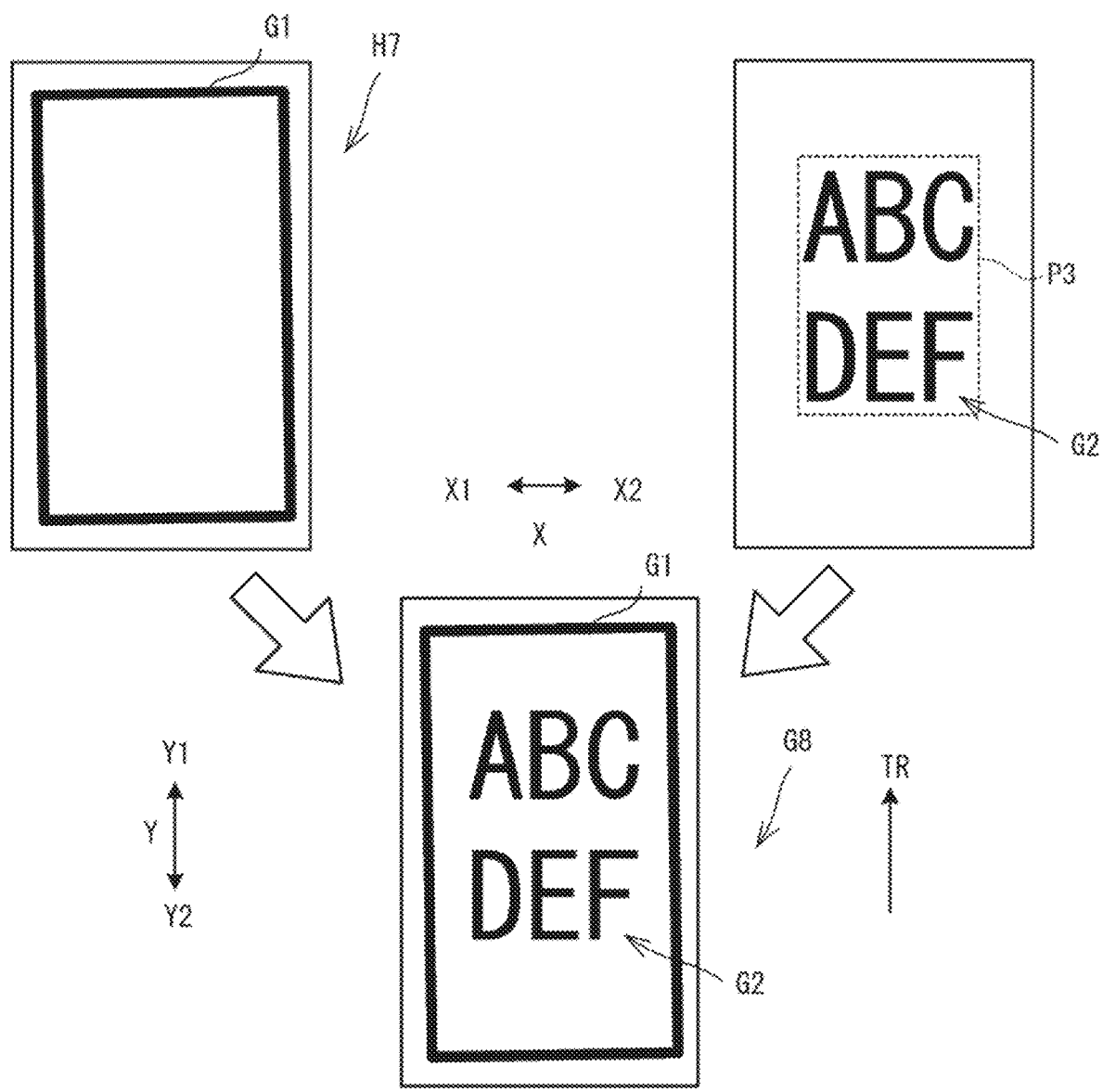
FIG. 14 is a view for explaining a process to generate a composite image.

Following S15 or S16, in S17 the CPU 7 determines whether the target image is one of the input image G and the high-resolution image or not. When the target image is either the input image G or the high-resolution image (S17: YES), in S19 the CPU 7 does not perform a process to combine partial images. However, when the target image is neither the input image G nor the high-resolution image (S17: No), the CPU 7 advances to S18. For example, if the target image is the target image H and has been edited using the sixth editing method (S17: NO), then in S18 the CPU 7 edits the print data by combining an edited image H7 that has been subjected to processing from S11 to S16 and has been edited in S12 with the non-target area P3 that is not subjected to processing from S11 to S16 to form data for printing a composite image G8, as shown in FIG. 14. Since the non-target area P3 in the composite image G8 has not been subjected to the editing process and conversion process, this non-target area P3 perfectly matches the non-target area P3 in the input image G or high-resolution image. However, since portions of the composite image G8 other than the non-target area P3 have been subjected to the editing process and conversion process, the portions have parts that do not match those in the input image G or high-resolution image other than the non-target area P3.

Figure 15:
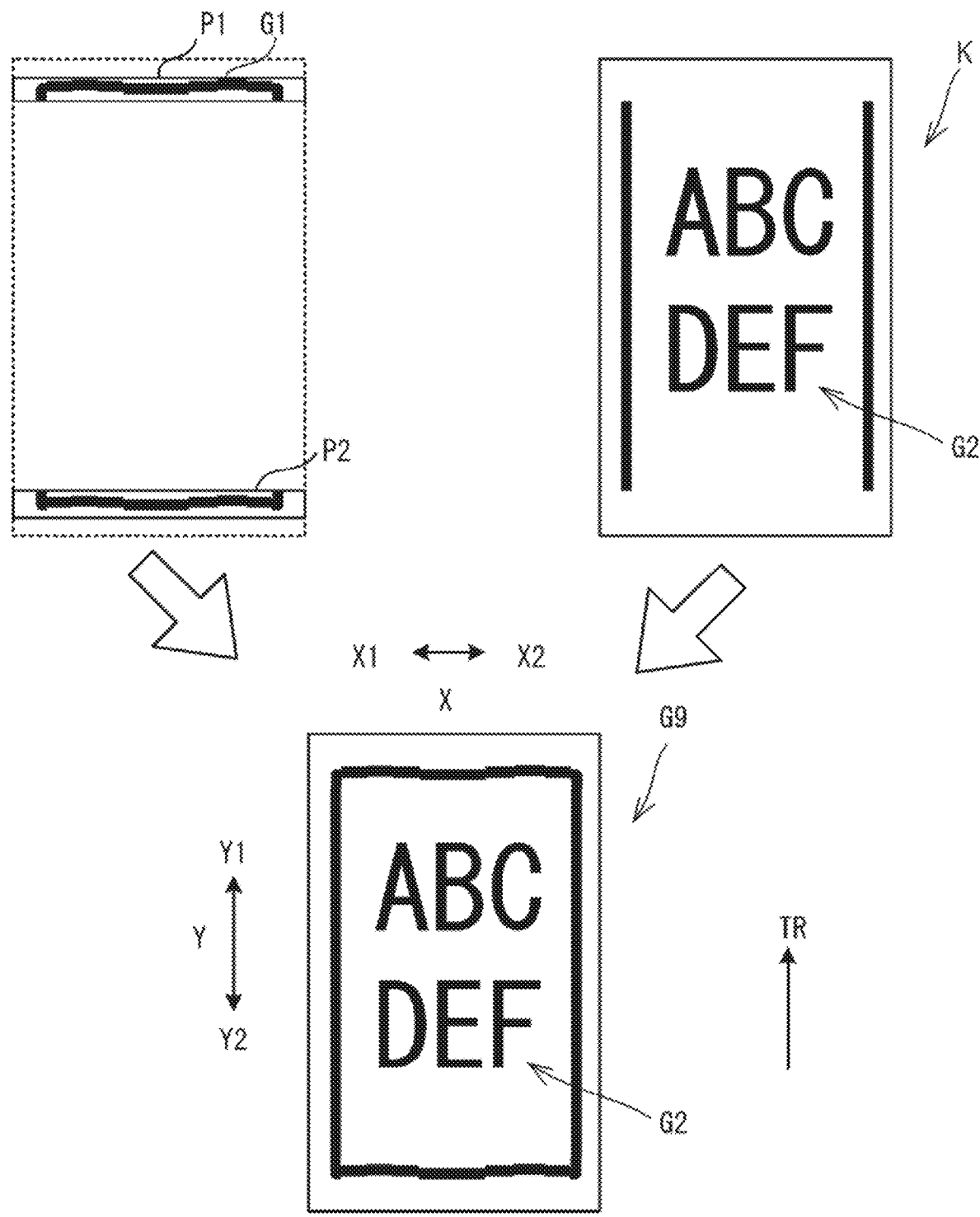
FIG. 15 is another view for explaining a process to generate a composite image.

If the target image is the target areas P1 and P2 and has been edited using the fourth editing method in which the target image is edited in an M-shape having three extreme values (S17: NO), in S18 the CPU 7 edits the print data by combining the target areas P1 and P2 subjected to processing from S11 to S16 and edited in S12 with a non-target area K that is not subjected to processing from S11 to S16 to form data for printing a composite image G9, as shown in FIG. 15. The CPU 7 ensures that portions of the rectangular border G1 extending in the sub-scanning direction Y are continuously connected in the composite image G9 by setting the slide amount to 0 for rectangular partial images in the target areas P1 and P2 that include either end portion of the rectangular border G1 in the main scanning direction X. Since portions of the composite image G9 excluding the target areas P1 and P2 are not subjected to the editing process and conversion process, these portions perfectly match portions of the input image G or high-resolution image excluding the target areas P1 and P2. However, since portions of the composite image G9 including the target areas P1 and P2 have been subjected to the editing and conversion processes, the portions have parts that do not match those in the input image G or high-resolution image. In the composite image G9, all the first, second, and third conditions are met when comparing a plurality of dots constituting the input image G and a plurality of dots constituting the print image to be printed according to the print data by units of columns constituted by a plurality of continuous dots in the sub-scanning direction Y within the target area P1. The target area P1 is a portion of the image between the upstream end DE on the upstream side Y2 in the sub-scanning direction Y and the downstream end UE on the downstream side Y1 in the sub-scanning direction Y. The first, second, and third conditions are similarly met for the target area P2.

Following S18 or S19, in S20 the CPU 7 determines whether divisional printing should be performed. Divisional printing is a method of printing one line in the main scanning direction X within the print data by dividing the elements 61 into N blocks (where N is an integer of 2 or greater) and sequentially energizing the N blocks at different timings such that the required peak of current flowing in the print head 6 when printing one line based on the print data becomes less than or equal to the maximum current that the power supply 10 can supply to the print head 6. The criteria for determining whether to perform divisional printing may be set as needed. For example, the CPU 7 may determine whether to perform divisional printing based on the number of ON dots in each line. When divisional printing is to be performed (S20: YES), in S21 the CPU 7 edits the print data such that at least some of the lines in the print data are divided into N parts in the sub-scanning direction Y. The method of division may be set as needed. In the present embodiment, the CPU 7 divides the printing cycle for one line into a plurality of sub-printing cycles of the same length, including a sub-printing cycle having the same start time as the printing cycle. The CPU 7 may set the method of division based on the editing method used in S12.

Figure 12:
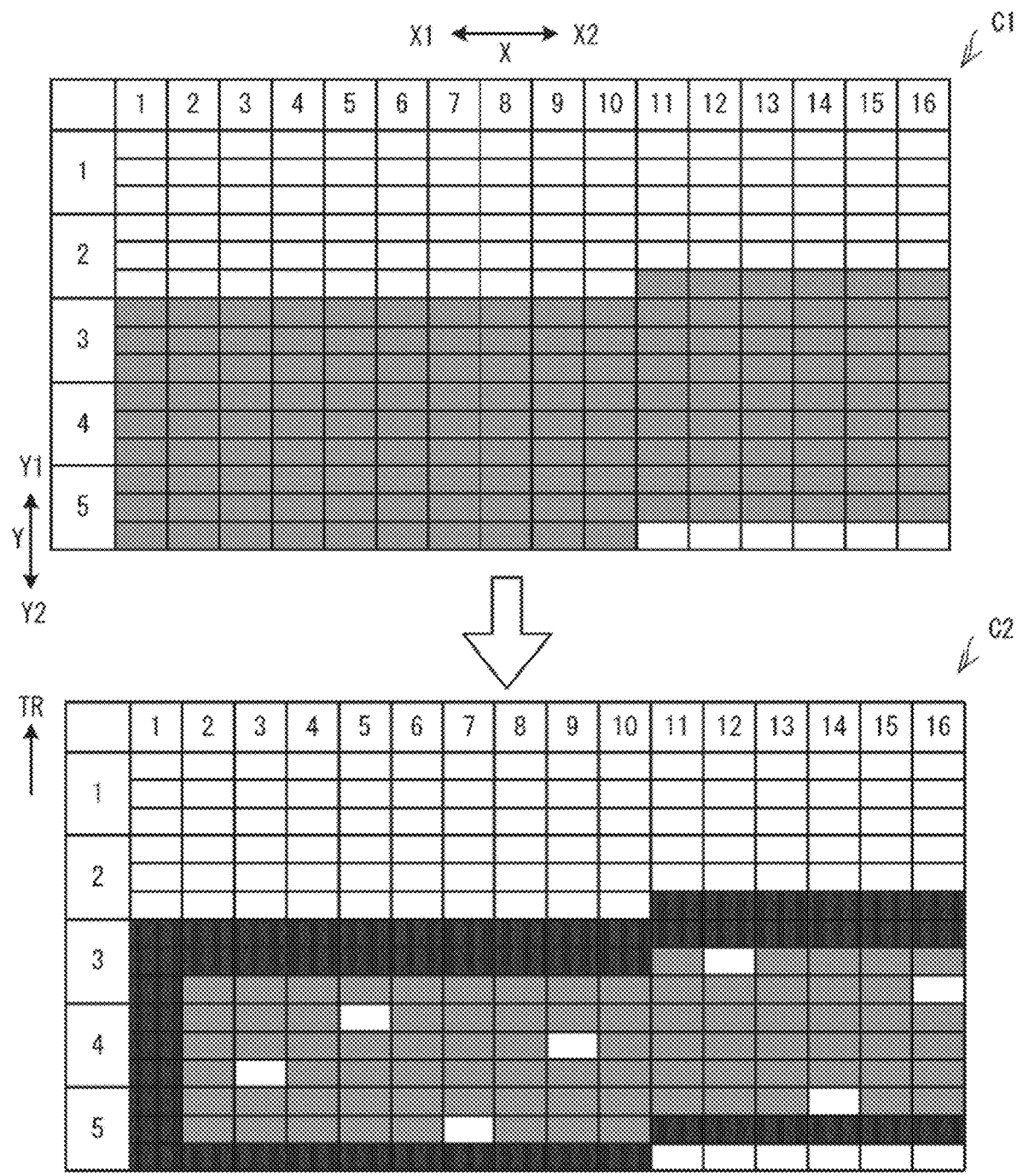
FIG. 12 is a view for explaining the conversion process in a specific example in which the editing process is performed.
Figure 16:
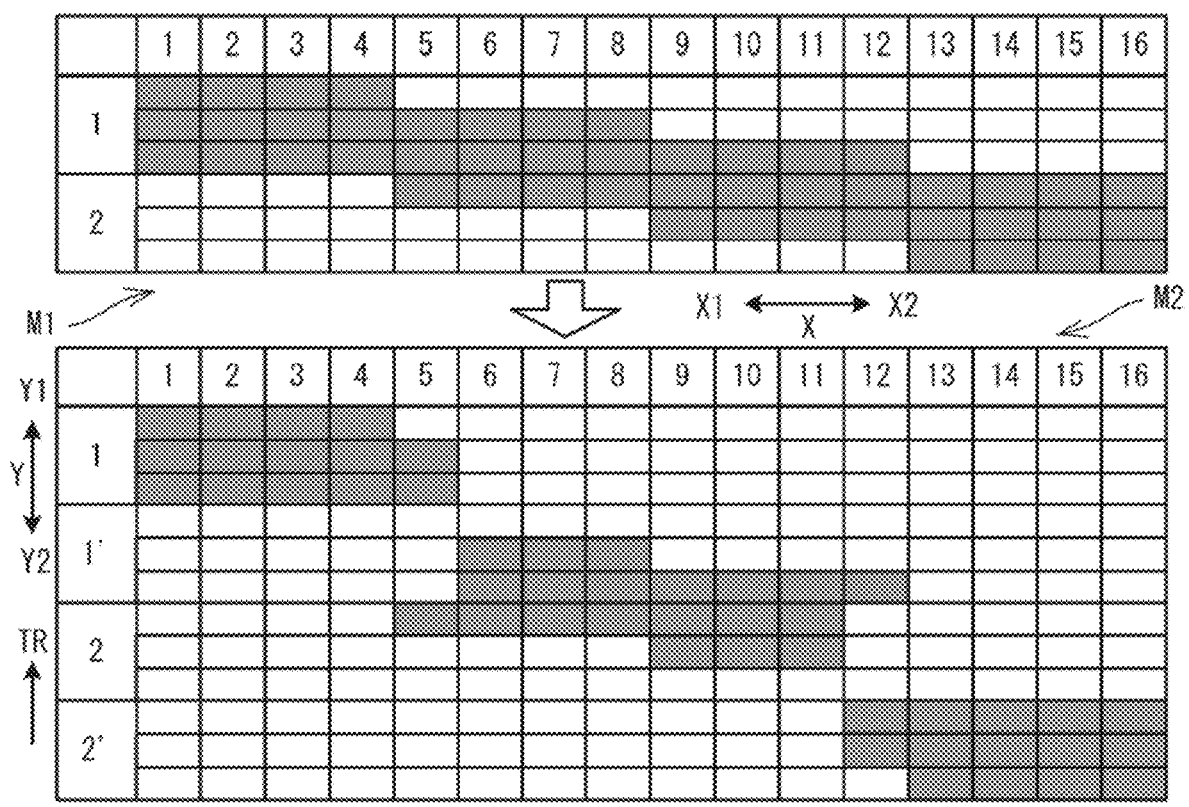
FIG. 16 is a view for explaining a dividing process.

When the CPU 7 edits print data in the editing process of FIG. 12 such that the slide amount has a smaller value from the first side X1 toward the second side X2 in the main scanning direction X (here, the slide amount toward the upstream side Y2 in the sub-scanning direction Y is a negative value and the slide amount toward the downstream side Y1 in the sub-scanning direction Y is a positive value), as in the image M1 of FIG. 16, in a divisional printing process the CPU 7 edits the print data such that the N blocks of the elements 61 are energized at different timings in sequence from the first side X1 toward the second side X2 in the main scanning direction X, as indicated in image M2 of FIG. 16. Note that FIG. 16 shows the case of N being 2. The line having identification number 1 in the image M1 is divided into two parts, namely a line having identification number 1 and a line having identification number 1' in the image M2. Similarly, the line having identification number 2 in the image M1 is divided into two parts, namely a line having identification number 2 and a line having identification number 2' in the image M2.

Figure 17:
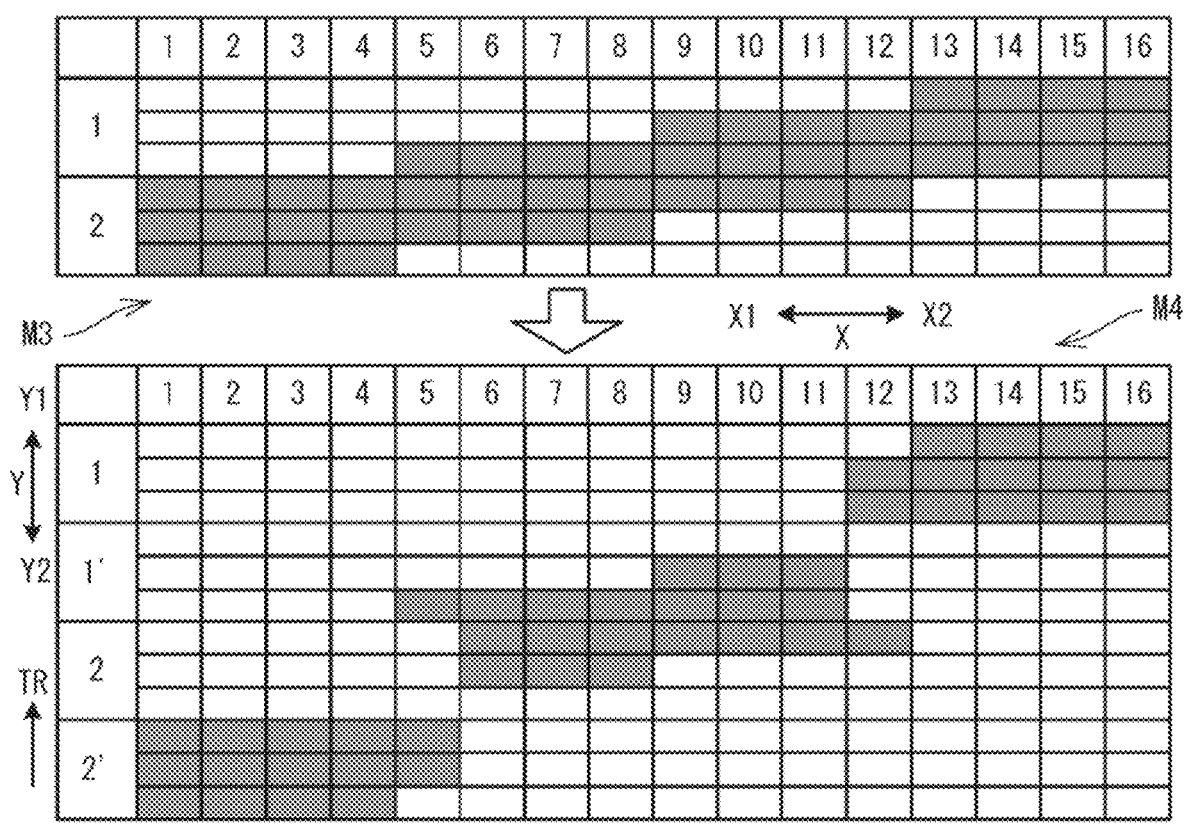
FIG. 17 is another view for explaining the dividing process.

When the CPU 7 edits print data in the editing process of S12 such that the slide amount has a larger value from the first side X1 toward the second side X2 in the main scanning direction X (here, the slide amount toward the upstream side Y2 in the sub-scanning direction Y is a negative value and the slide amount toward the downstream side Y1 in the sub-scanning direction Y is a positive value), as depicted in image M3 in FIG. 17, in the divisional printing process the CPU 7 edits the print data such that the N blocks of the elements 61 are energized sequentially at different timings from the second side X2 toward the first side X1 in the main scanning direction X, as depicted in an image M4 in FIG. 17. Note that FIG. 17 also shows the case of N being 2. Here, the line having identification number 1 in the image M3 is divided into two parts, namely a line having identification number 1 and a line having identification number 1' in the image M4. Similarly, the line having identification number 2 in the image M3 is divided into two parts, namely a line having identification number 2 and a line having identification number 2' in the image M4. The CPU 7 sets the printing start timings for the sub-lines such that those start timings arrive at equal time intervals.

In S23 the CPU 7 performs divisional printing based on the print data edited in S21. The CPU 7 executes divisional printing by driving the elements 61 in a plurality of sub-printing cycles. If divisional printing is not to be performed (S20: NO), in S22 the CPU 7 performs a printing process based on the print data produced in S18 or S19. The CPU 7 sets the heating quantity of elements 61 larger for conversion candidate sub-dots than contour sub-dots according to the print data and executes a printing process for forming an image on the print target F by heating the elements 61 in S22 or S23. Following S22 or S23, the CPU 7 ends the printing process.

Figure 19:
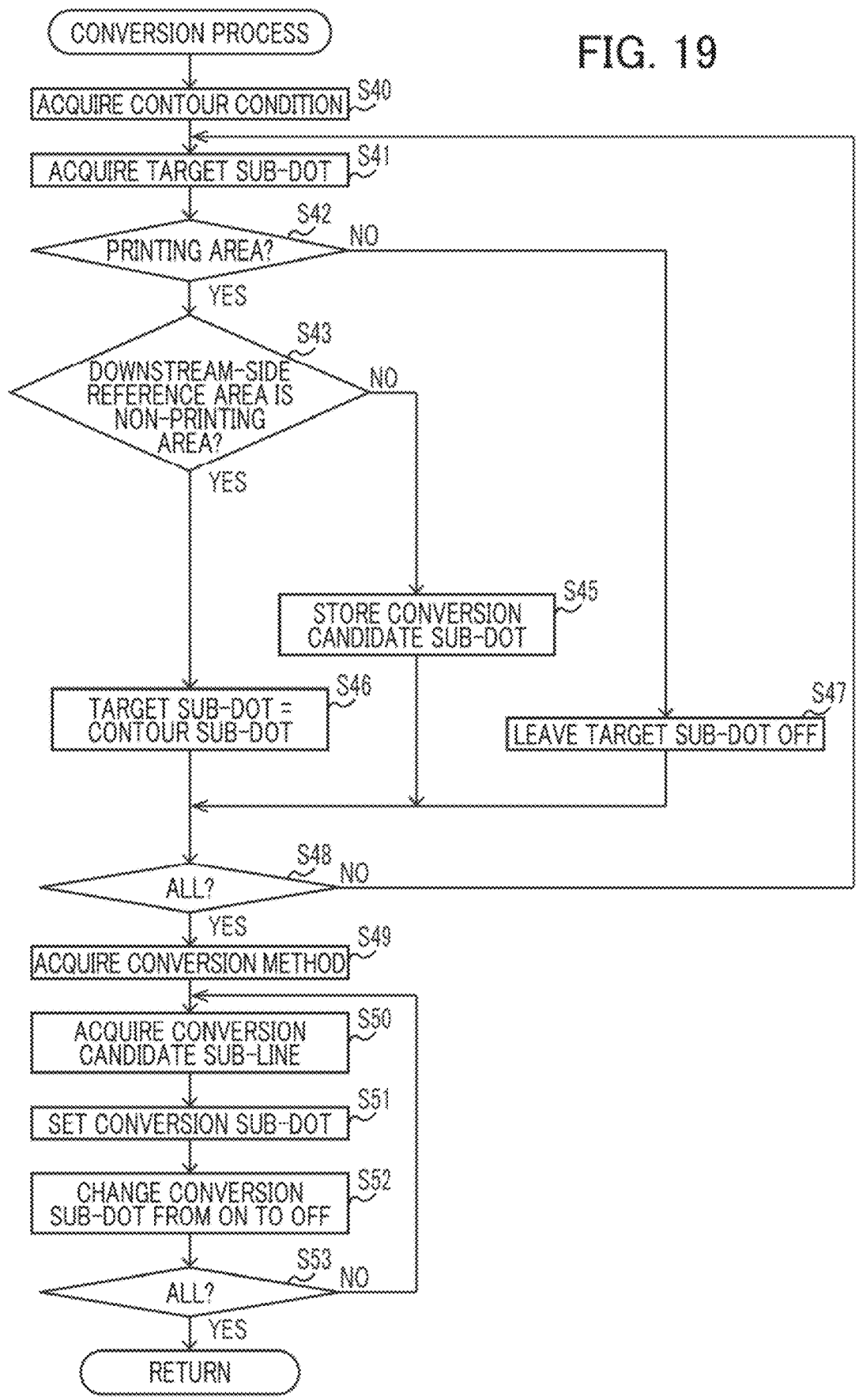
FIG. 19 is a flowchart of a conversion process executed in a printing process performed by a variation of the printing device 1.

Next, a variation of the conversion process will be described with reference to FIG. 19. In FIG. 19, the same step numbers are assigned to processes identical to those in the conversion process of the embodiment shown in FIG. 9. The conversion process according to the variation shown in FIG. 19 differs from the conversion process according to the embodiment shown in FIG. 9 in that the process of S44 is omitted. Thus, in the conversion process according to this variation, when a target sub-dot, which is one of the plurality of sub-dots, is the printing area (S42: YES), the U-th sub-dot (where U is any integer of 0 or greater) on the downstream side Y1 in the sub-scanning direction Y relative to the target sub-dot is set as the reference sub-dot. If this reference sub-dot is the printing area (S43: NO), in S45 the CPU 7 sets the target sub-dot as the conversion candidate sub-dot. The remaining process is identical to that in FIG. 9, and a description of this process will not be repeated.

The printing device 1 is an example of the printing device and also is an example of the print data editing device. The storage unit 9 is an example of the non-transitory computer-readable storage medium. The plurality of elements 61 is an example of the plurality of heating elements. The print head 6 is an example of the print head. The conveying unit 5 is an example of the conveying unit. The CPU 7 is an example of the controller and also is an example of the processor. The process in S1 is an example of the acquiring in (a). The process in S15 is an example of the converting in (b).

The printing device 1 according to the embodiment described above is provided with the print head 6, conveying unit 5, and CPU 7. The printing device 1 has the plurality of elements 61 linearly aligned in the main scanning direction X. The conveying unit 5 causes the print target and print head 6 to move relative to each other in the sub-scanning direction Y, which crosses the main scanning direction X. The printing device 1 edits print data to be used by the printing device 1 for forming an image on the print target F so that the print data includes data specifying either ON or OFF for each of the plurality of elements 61.

In the printing process, the printing device 1 moves the print head 6 in the sub-scanning direction Y relative to the print target F while driving the elements 61 based on the print data to form an image on the print target F by lines corresponding to the elements 61 aligned in the main scanning direction X. The CPU 7 acquires image data associated with the elements 61 aligned in the main scanning direction X (S1).

When a printing unit obtained by dividing a dot defined by the elements 61 into M parts in the sub-scanning direction Y (where M is an integer of two or greater) is defined as a sub-dot, a plurality of sub-dots aligned in the main scanning direction X is defined as a sub-line, the sub-dot for which the print data indicates ON is defined as a printing area, and the sub-dot for which the print data indicates OFF or an area outside the printing region is defined as a non-printing area, the CPU 7 performs a conversion process to generate print data in which conversion sub-dots have been changed from ON to OFF, where the conversion sub-dots are at least one or more sub-dots in all sub-lines of at least one line in the printing areas (S15).

By executing the conversion process in S15, the printing device 1 can maintain printing quality with less possibility than in the conventional method for the peak current supplied to the print head 6 to exceed the maximum current value that the power supply 10 can supply. By reducing the number of elements 61 in a single line that are ON, the printing device 1 can more likely achieve a faster printing speed than in a conventional method that does not implement the conversion process.

Since the printing device 1 forms images on a print target through the thermal transfer of ink from the ink ribbon 48, the cohesive force of ink in the ink ribbon 48 functions as a printing-related factor, unlike when printing on a thermal recording medium. Therefore, the printing device 1 can edit print data such that heat transferability of the ink ribbon 48 can be maintained by providing very short time periods of no heating to an extent that does not affect thermal transfer. Accordingly, the printing device 1 can edit print data to improve both printing quality and printing speed compared to the conventional method.

In the conversion process of S15, when one target sub-dot among the plurality of sub-dots is the printing area, the printing device 1 sets the U-th sub-dot (where U is any integer of 0 or greater) on the downstream side Y1 in the sub-scanning direction Y of this target sub-dot as the reference sub-dot. If the reference sub-dot is a non-printing area (S43: YES), the CPU 7 assumes that the target sub-dot is a contour sub-dot and leaves the image data or print data for the contour sub-dot ON (S46). Therefore, the printing device 1 can edit the print data such that faint printing is less likely to occur at the printing start point.

In the conversion process of S15, when one target sub-dot among the plurality of sub-dots is in the printing area, the CPU 7 sets this target sub-dot to a contour sub-dot when any of the U-th sub-dot on the downstream side Y1 in the sub-scanning direction Y (where U is any integer of 0 or greater), the D-th sub-dot on the upstream side Y2 in the sub-scanning direction Y (where D is any integer of 0 or greater), the L-th sub-dot on the first side X1 in the main scanning direction X (where L is any integer of 0 or greater), and the R-th sub-dot on the second side X2 in the main scanning direction X (where R is any integer of 0 or greater) relative to the target sub-dot is in a non-printing area (S43: YES, S44: YES) and leaves the image data or print data for the contour sub-dot ON (S46). Hence, the printing device 1 can edit print data to avoid faint contours in the image formed on the print target F.

In the conversion process of S15, when the reference sub-dot for a target sub-dot is the printing area (S42: YES), the printing device 1 according to the variation sets that target sub-dot to a conversion candidate sub-dot and changes the image data or print data for at least one conversion candidate sub-dot from ON to OFF in all sub-lines of at least one line within all conversion candidate sub-dots in the image data (S51, S52). Thus, the printing device 1 can reduce the number of sub-dots that are ON in portions of the printing area where fading is less likely to occur than at a printing start point.

In the conversion process of S15, when one target sub-dot among the plurality of sub-dots is the printing area (S42: YES), the CPU 7 sets this target sub-dot to a conversion candidate sub-dot (S45) when the U-th sub-dot on the downstream side Y1 in the sub-scanning direction Y (where U is any integer of 0 or greater), the D-th sub-dot on the upstream side Y2 in the sub-scanning direction Y (where D is any integer of 0 or greater), the L-th sub-dot on the first side X1 in the main scanning direction X (where L is any integer of 0 or greater), and the R-th sub-dot on the second side X2 in the main scanning direction X (where R is any integer of 0 or greater) relative to the target sub-dot are all the printing area (S43: NO and S44: NO) and changes the print data for at least one conversion candidate sub-dot from ON to OFF in all sub-lines of at least one line within all conversion candidate sub-dots in the image data (S51, S52). Thus, the printing device 1 can reduce the number of sub-dots that are ON in portions of the printing area that are less likely to fade than in contour areas.

In the conversion process, the CPU 7 changes print data for conversion candidate sub-dots from ON to OFF at a ratio of B/C both in the main scanning direction X and in the sub-scanning direction Y (where B and C are natural numbers; S51, S52). The printing device 1 can modify sub-dots from ON to OFF uniformly at the ratio B/C for each of the main scanning direction X and sub-scanning direction Y. Hence, the printing device 1 can edit print data such that conversion sub-dots are less noticeable than when the ratio of conversion candidate sub-dots changed from ON to OFF is nonuniform.

In the conversion process, when the print data for the target sub-dot is ON and the sub-dot adjacent to the target sub-dot on the downstream side Y1 in the sub-scanning direction Y is a conversion sub-dot, the CPU 7 leaves the print data for the target sub-dot ON (S51, S52). The printing device 1 can reliably avoid setting sub-dots that are contiguous in the sub-scanning direction Y as conversion sub-dots that are changed from ON to OFF. Thus, the printing device 1 can utilize the cohesion of ink in the ink ribbon 48 to thermally transfer ink from the ink ribbon 48 onto the print target more easily for conversion sub-dots than if sub-dots that are contiguous in the sub-scanning direction Y were set as conversion sub-dots.

In the conversion process, when print data for the target sub-dot is ON and at least one sub-dot adjacent to the target sub-dot in the main scanning direction X is a conversion sub-dot, the CPU 7 leaves the print data for the target sub-dot ON (S51, S52). Therefore, the printing device 1 can reliably avoid setting sub-dots that are contiguous in the main scanning direction X as conversion sub-dots that are changed from ON to OFF. In this way, the printing device 1 can utilize the cohesion of ink in the ink ribbon 48 to thermally transfer ink from the ink ribbon 48 onto the print target for conversion sub-dots more easily than if sub-dots contiguous in the main scanning direction X are set as conversion sub-dots.

In the conversion process, when print data for the target sub-dot is ON and at least one of the eight peripheral sub-dots surrounding the target sub-dot is a conversion sub-dot, the CPU 7 leaves the print data for the target sub-dot ON (S51, S52). In this way, the printing device 1 can reliably avoid setting any of the eight peripheral sub-dots as a conversion sub-dot to be changed from ON to OFF. Hence, the printing device 1 can utilize the cohesion of ink in the ink ribbon 48 to thermally transfer ink from the ink ribbon 48 to the print target for conversion sub-dots more easily than when two or more neighboring sub-dots are set as conversion sub-dots.

The CPU 7 edits print data corresponding to the image data (S12). When comparing a plurality of dots constituting an input image represented by image data with a plurality of dots constituting a print image printed based on print data in units of columns, which have a plurality of dots arrayed continuously in the sub-scanning direction Y in at least the area from the upstream end DE on the upstream side Y2 in the sub-scanning direction Y to the downstream end UE on the downstream side Y1 in the sub-scanning direction Y, the CPU 7 edits the print data such that coincidence is maximized when the image included in the column of the print image is at the same position as the image represented by the corresponding column in the input image or has been shifted the corresponding shift amount in the sub-scanning direction and the maximum value of absolutes values of the plurality of shift amounts for the plurality of columns is one dot or more. By executing this editing process, the printing device 1 can edit the print data to suppress the peak current in the print head 6 required when printing one line. By executing the conversion process in addition to the editing process, the printing device 1 can maintain printing quality while reducing the possibility of the peak current supplied to the print head 6 exceeding the maximum current value that the power supply 10 can supply.

While the print data editing device, print data editing method, and print data editing program of the present disclosure have been described in detail with reference to specific embodiments thereof, it would be apparent to those skilled in the art that many modifications and variations may be made therein without departing from the spirit of the invention, the scope of which is defined by the attached claims. The invention may be implemented in various forms, such as a non-transitory computer-readable storage medium storing the print data editing program. The configuration of the printing device 1 may be modified as needed. For example, the conveying unit 5 may move the print head 6 to change the relative position of the print head 6 and the print target. The communication unit 4 may be configured to perform wired or wireless communication with the external device W.

Programs that include instructions for executing the process in FIG. 2 may be stored in a storage device of the printing device 1 until the CPU 7 executes the corresponding program. Therefore, each of the method and route for acquiring the program and the device for storing the program may be modified as needed. Programs executed by the printing device 1 may be received from other devices via a cable or wireless communication and stored in a storage unit of the printing device 1 or other storage device. Examples of other devices include PCs and servers connected via a network.

While the CPU 7 executes each step of the printing process in the above examples, all or some of the steps may be executed by another electronic device (an ASIC, for example). Alternatively, steps in the printing process may be executed through distributed processing performed by a plurality of electronic devices (a plurality of CPUs, for example). Steps may also be added to or omitted from the printing process, and the order of the steps may be modified as needed. The following modifications may be incorporated in the printing process as appropriate.

The process from S10 to S13 may be suitably modified or may be omitted. The number and types of editing methods that the CPU 7 can execute may be suitably modified. For example, the CPU 7 may be capable of executing only one of the first through sixth editing methods. The CPU 7 may execute an editing process on the high-resolution image of S3 or the input image of S4 without receiving any specification for at least one of a feature area, target area, and non-target area. When a plurality of target areas P1 and P2 has been set, the CPU 7 may apply the same editing method or different editing methods to each target area. The CPU 7 may simply execute the editing process without determining in S11 whether to execute an editing process. When a feature area or a non-target area has been specified, the CPU 7 may perform an editing process with the shift amounts set to 0 over a range in the main scanning direction X that includes the specified area. The CPU 7 may perform an editing process without satisfying the second condition. Alternatively, both the second editing condition and third editing condition may be omitted from the editing conditions as appropriate.

The CPU 7 may simply execute the conversion process without first determining in S14 whether to execute a conversion process. The number and types of conversion methods that the CPU 7 can execute may be modified as needed. For example, the CPU 7 may be capable of executing only one of the first through fourth conversion methods. The CPU 7 may perform the conversion process using a method other than the first through fourth conversion methods. As shown in FIG. 18, the CPU 7 may first edit print data in the print image J2 based on image data in the input image J1 and subsequently perform a conversion process to convert the print data for producing the print image J4. Alternatively, the CPU 7 may first perform a conversion process based on image data in the input image J1 to produce a print image J3 and subsequently execute an editing process for producing the print image J4. In the conversion process, the CPU 7 may change image data or print data from ON to OFF for conversion sub-dots, which are one or more sub-dots in each of all sub-lines within at least one line in the printing areas. In S22 or S23, the CPU 7 need not set the heating quantity for conversion candidate sub-dots larger than that for contour sub-dots. The CPU 7 may omit the process from S40 to S48 and perform the conversion process by treating all sub-dots in the printing areas as conversion candidate sub-dots. The CPU 7 may modify the number of conversion candidate sub-dots that are set based on the number of conversion candidate sub-dots included in a conversion candidate sub-line acquired in S50.

The process of S21 and S23 may be omitted as appropriate. The CPU 7 may execute the process in S21 and S23 without determining in S20 whether divisional printing should be performed. When divisional printing is to be performed, the CPU 7 may determine the order for driving the blocks of elements 61 irrespective of the editing method used in S12. The process from S2 to S4 may be modified as needed. The above variations may be combined as needed to the extent that they are compatible.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A print data editing device comprising:
   a controller configured to edit print data to be used in a printing device, the printing device including a print head, a conveying unit, and an ink ribbon, the print head including a plurality of heating elements linearly arrayed in a main-scanning direction, the conveying unit being configured to cause the print head and a print target to move relative to each other in a sub-scanning direction crossing the main-scanning direction, the print data including data indicating either ON or OFF for each heating element, the printing device being configured to perform image formation on the print target on the basis of the print data while causing the print head and the print target to move relative to each other in the sub-scanning direction to thereby form an image represented by the print data on the print target, the printing device being configured to form the image by causing, on the basis of the print data, selected one or more of the heating elements to generate heat to transfer ink of the ink ribbon onto the print target line by line, the image represented by the print data being constituted by a plurality of dots defined by the plurality of heating elements, one line being constituted by a plurality of sub-lines, each sub-line being constituted by a plurality of sub-dots, the sub-dot being a printing unit obtained by dividing the dot into M parts in the sub-scanning direction, where M is an integer of two or greater, the sub-dot for which the print data indicates ON being a printing area, the sub-dot for which the print data indicates OFF being a non-printing area, an area outside a printing region being the non-printing area,
   the controller being configured to perform:
   (a) acquiring print data representing an image; and
   (b) converting the print data acquired in (a), the converting in (b) comprising:
      (b1) determining, as a conversion sub-dot, one or more of the sub-dots included in the sub-line for each of all the sub-lines constituting the one line within the printing areas in the image represented by the print data acquired in (a); and
      (b2) editing the print data acquired in (a) such that the print data acquired in (a) indicates OFF for the one or more sub-dots determined in (1) as the conversion sub-dot.

2. The print data editing device according to claim 1, wherein the converting in (b) further comprises:
   (b3) acquiring, as a target sub-dot, one of the sub-dots constituting the image represented by the print data acquired in (a);
   (b4) determining whether the target sub-dot acquired in (b3) is the printing area;
   (b5) determining, in response to determining in (b4) that the target sub-dot acquired in (b3) is the printing area, whether a reference sub-dot is the non-printing area, the reference sub-dot being a U-th sub-dot on a downstream side in the sub-scanning direction relative to the target sub-dot acquired in (b3), where U is an integer of zero or greater; and
   (b6) determining, in response to determining in (b5) that the reference sub-dot is the non-printing area, the target sub-dot acquired in (b3) as a contour sub-dot, wherein, in the converting in (b), the print data acquired in (a) is left indicating ON for the contour sub-dot determined in (b6).

3. The print data editing device according to claim 2, wherein the converting in (b) further comprises:
(b7) determining, in response to determining in (b5) that the reference sub-dot is the printing area, the target sub-dot acquired in (b3) as a conversion candidate sub-dot, and
wherein, in the determining in (b1), the controller determines, as the conversion sub-dot, one or more of the conversion candidate sub-dots included in the sub-line for each of all the sub-lines constituting the one line within the conversion candidate sub-dots in the image represented by the print data acquired in (a).

4. The print data editing device according to claim 2, wherein, in the converting in (b), the print data acquired in (a) is left indicating ON for the target sub-dot when the print data acquired in (a) indicates ON for the target sub-dot and the sub-dot adjacent to the target sub-dot on the downstream side in the sub-scanning direction is the conversion sub-dot.

5. The print data editing device according to claim 2, wherein, in the converting in (b), the print data acquired in (a) is left indicating ON for the target sub-dot when the print data acquired in (a) indicates ON for the target sub-dot and at least one of the sub-dots adjacent to the target sub-dot in the main-scanning direction is the conversion sub-dot.

6. The print data editing device according to claim 2, wherein, in the converting in (b), the print data acquired in (a) is left indicating ON for the target sub-dot when the print data acquired in (a) indicates ON for the target sub-dot and at least one of eight peripheral sub-dots is the conversion sub-dot, the eight peripheral sub-dots being eight of the sub-dots surrounding the target sub-dot.

7. The print data editing device according to claim 1, wherein the converting in (b) further comprises:
(b3) acquiring, as a target sub-dot, one of the sub-dots constituting the image represented by the print data acquired in (a);
(b4) determining whether the target sub-dot acquired in (b3) is the printing area;
(b5) determining, in response to determining in (b4) that the target sub-dot acquired in (b3) is the printing area, whether even one of a first reference sub-dot, a second reference sub-dot, a third reference sub-dot, and a fourth reference sub-dot is the non-printing area, the first reference sub-dot being a U-th sub-dot on a downstream side in the sub-scanning direction relative to the target sub-dot acquired in (b3), the second reference sub-dot being a D-th sub-dot on an upstream side in the sub-scanning direction relative to the target sub-dot acquired in (b3), the third reference sub-dot being a L-th sub-dot on one side in the main-scanning direction relative to the target sub-dot acquired in (b3), the fourth reference sub-dot being a R-th sub-dot on another side in the main-scanning direction relative to the target sub-dot acquired in (b3), where U, D, L, and R are each an integer of zero or greater; and
(b6) determining, in response to determining in (b5) that even one of the first reference sub-dot, the second reference sub-dot, the third reference sub-dot, and the fourth reference sub-dot is the non-printing area, the target sub-dot acquired in (b3) as a contour sub-dot, and
wherein, in the converting in (b), the print data acquired in (a) is left indicating ON for the contour sub-dot determined in (b6).

8. The print data editing device according to claim 7, wherein the converting in (b) further comprises:
(b7) determining, in response to determining in (b5) that none of the first reference sub-dot, the second reference sub-dot, the third reference sub-dot, and the fourth reference sub-dot is the non-printing area, the target sub-dot acquired in (b3) as a conversion candidate sub-dot, and
wherein, in the determining in (b1), the controller determines, as the conversion sub-dot, one or more of the conversion candidate sub-dots included in the sub-line for each of all the sub-lines constituting the one line within the conversion candidate sub-dots in the image represented by the print data acquired in (a).

9. The print data editing device according to claim 3, wherein, in the converting in (b), the controller edits the print data acquired in (a) such that the print data acquired in (a) indicates OFF for the conversion candidate sub-dots determined in (b7) at a specific ratio both in the main-scanning direction and in the sub-scanning direction, the specific ratio being a ratio determined by dividing B by C, where B and C are each a natural number.

10. The print data editing device according to claim 1, wherein the controller is configured to further perform:
(c) editing the print data acquired in (a) such that when the sub-dots constituting the image represented by the print data acquired in (a) are compared by units of columns before and after performing the editing in (c), a coincidence is maximized when an image of each column in the image after the editing in (c) is the same position as an image of the corresponding column in the image before the editing in (c) or is shifted by a corresponding shift amount in the sub-scanning direction relative to the image of the corresponding column in the image before the editing in (c), each column being constituted by the sub-dots continuously aligned in the sub-scanning direction at least partially between an upstream end and a downstream end in the sub-scanning direction, and
wherein an absolute value of at least one of the shift amounts for the columns in the image after the editing in (c) is one dot or greater.

11. A print data editing method performed by a controller of a print data editing device configured to edit print data to be used in a printing device, the printing device including a print head, a conveying unit, and an ink ribbon, the print head including a plurality of heating elements linearly arrayed in a main-scanning direction, the conveying unit being configured to cause the print head and a print target to move relative to each other in a sub-scanning direction crossing the main-scanning direction, the print data including data indicating either ON or OFF for each heating element, the printing device being configured to perform image formation on the print target on the basis of the print data while causing the print head and the print target to move relative to each other in the sub-scanning direction to thereby form an image represented by the print data on the print target, the printing device being configured to form the image by causing, on the basis of the print data, selected one or more of the heating elements to generate heat to transfer ink of the ink ribbon onto the print target line by line, the image represented by the print data being constituted by a plurality of dots defined by the plurality of heating elements, one line being constituted by a plurality of sub-lines, each sub-line being constituted by a plurality of sub-dots, the sub-dot being a printing unit obtained by dividing the dot into M parts in the sub-scanning direction, where M is an integer of two or greater, the sub-dot for which the print data indicates ON being a printing area, the sub-dot for which the print data indicates OFF being a non-printing area, an area outside a printing region being the non-printing area, the print data editing method comprising:
- (a) acquiring print data representing an image; and
- (b) converting the print data acquired in (a), the converting in (b) comprising:
  - (b1) determining, as a conversion sub-dot, one or more of the sub-dots included in the sub-line for each of all the sub-lines constituting the one line within the printing areas in the image represented by the print data acquired in (a); and
  - (b2) editing the print data acquired in (a) such that the print data acquired in (a) indicates OFF for the one or more sub-dots determined in (b1) as the conversion sub-dot.

12. A non-transitory computer-readable storage medium storing a set of computer-readable instructions for a print data editing device comprising a processor configured to edit print data to be used in a printing device, the printing device including a print head, a conveying unit, and an ink ribbon, the print head including a plurality of heating elements linearly arrayed in a main-scanning direction, the conveying unit being configured to cause the print head and a print target to move relative to each other in a sub-scanning direction crossing to the main-scanning direction, the print data including data indicating either ON or OFF for each heating element, the printing device being configured to perform image formation on the print target on the basis of the print data while causing the print head and the print target to move relative to each other in the sub-scanning direction to thereby form an image represented by the print data on the print target, the printing device being configured to form the image by causing, on the basis of the print data, selected one or more of the heating elements to generate heat to transfer ink of the ink ribbon onto the print target line by line, the image represented by the print data being constituted by a plurality of dots defined by the plurality of heating elements, one line being constituted by a plurality of sub-lines, each sub-line being constituted by a plurality of sub-dots, the sub-dot being a printing unit obtained by dividing the dot into M parts in the sub-scanning direction, where M is an integer of two or greater, the sub-dot for which the print data indicates ON being a printing area, the sub-dot for which the print data indicates OFF being a non-printing area, an area outside a printing region being the non-printing area, the set of computer-readable instructions, when executed by the processor, causing the print data editing device to perform:
- (a) acquiring print data representing an image; and
- (b) converting the print data acquired in (a), the converting in (b) comprising:
  - (b1) determining, as a conversion sub-dot, one or more of the sub-dots included in the sub-line for each of all the sub-lines constituting the one line within the printing areas in the image represented by the print data acquired in (a); and
  - (b2) editing the print data acquired in (a) such that the print data acquired in (a) indicates OFF for the one or more sub-dots determined in (b1) as the conversion sub-dot.

* * * * *